US012206185B2

(12) United States Patent
Gerber

(10) Patent No.: US 12,206,185 B2
(45) Date of Patent: Jan. 21, 2025

(54) ANTENNA DEVICE

(71) Applicant: Advanced Semiconductor Engineering, Inc., Kaohsiung (TW)

(72) Inventor: Mark Gerber, Allen, TX (US)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 276 days.

(21) Appl. No.: 17/503,228

(22) Filed: Oct. 15, 2021

(65) Prior Publication Data

US 2023/0123962 A1 Apr. 20, 2023

(51) Int. Cl.

| | |
|---|---|
| ***H01Q 1/22*** | (2006.01) |
| ***H01Q 5/378*** | (2015.01) |
| *H01Q 23/00* | (2006.01) |

(52) U.S. Cl.

CPC ........... *H01Q 5/378* (2015.01); *H01Q 1/2283* (2013.01); *H01Q 23/00* (2013.01)

(58) Field of Classification Search

CPC ....... H01Q 1/2283; H01Q 5/378; H01Q 23/00

See application file for complete search history.

(56) References Cited

U.S. PATENT DOCUMENTS

| | | | | |
|---|---|---|---|---|
| 7,053,834 B2 * | 5/2006 | Ueda | H01Q 9/0414 | 343/846 |
| 11,018,422 B2 | 5/2021 | Hsu et al. | | |
| 2015/0097634 A1 * | 4/2015 | Ghassemi | H05K 1/024 | 29/601 |
| 2016/0056544 A1 * | 2/2016 | Garcia | H01Q 9/0407 | 343/725 |
| 2018/0205155 A1 | 7/2018 | Mizunuma et al. | | |
| 2020/0098709 A1 * | 3/2020 | Lin | H01L 23/3128 | |
| 2022/0085510 A1 * | 3/2022 | Park | H01Q 9/0414 | |
| 2022/0216590 A1 * | 7/2022 | Yamakawa | H01Q 9/0407 | |

* cited by examiner

*Primary Examiner* — Daniel Munoz

(74) *Attorney, Agent, or Firm* — FOLEY & LARDNER LLP

(57) ABSTRACT

The present disclosure provides an antenna device. The antenna device includes a dielectric element including a first region and a second region, a first antenna disposed on the first region, and a second antenna disposed on the second region. The first antenna and the second antenna are configured to operate in different frequencies. The first antenna and the second antenna are misaligned in directions perpendicular and parallel to a surface of the dielectric element on which the first antenna or the second antenna is disposed.

20 Claims, 21 Drawing Sheets

ANTENNA DEVICE

BACKGROUND

1. Technical Field

The present disclosure relates to an antenna device.

2. Description of the Related Art

Wireless communication systems may require multiple-band antennas for transmitting and receiving radio frequency (RF) at different frequency bands to support, e.g., higher data rates, increased functionality, and more users. Therefore, it is desirable for an antenna package (such as Antenna in Package (AiP)) to have multiple-band performance.

SUMMARY

In some embodiments, an antenna device includes a dielectric element including a first region and a second region, a first antenna disposed on the first region, and a second antenna disposed on the second region. The first antenna and the second antenna are configured to operate in different frequencies. The first antenna and the second antenna are misaligned in directions perpendicular and parallel to a surface of the dielectric element on which the first antenna or the second antenna is disposed.

In some embodiments, an antenna device includes a dielectric element including a first region and a second region. The dielectric element is configured to provide a first antenna gain with an antenna when the antenna is placed on the first region, and configured to provide a second antenna gain with the antenna when the antenna is placed on the second region. The first antenna gain is greater than the second antenna gain.

In some embodiments, an antenna device includes a dielectric element having a surface, a first antenna disposed over the dielectric element, and a second antenna disposed over the dielectric element and below the first antenna. The antenna and the second antenna are configured to operate in different frequencies. The first antenna is misaligned with the second antenna in an aspect perpendicular to the surface of the dielectric element.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
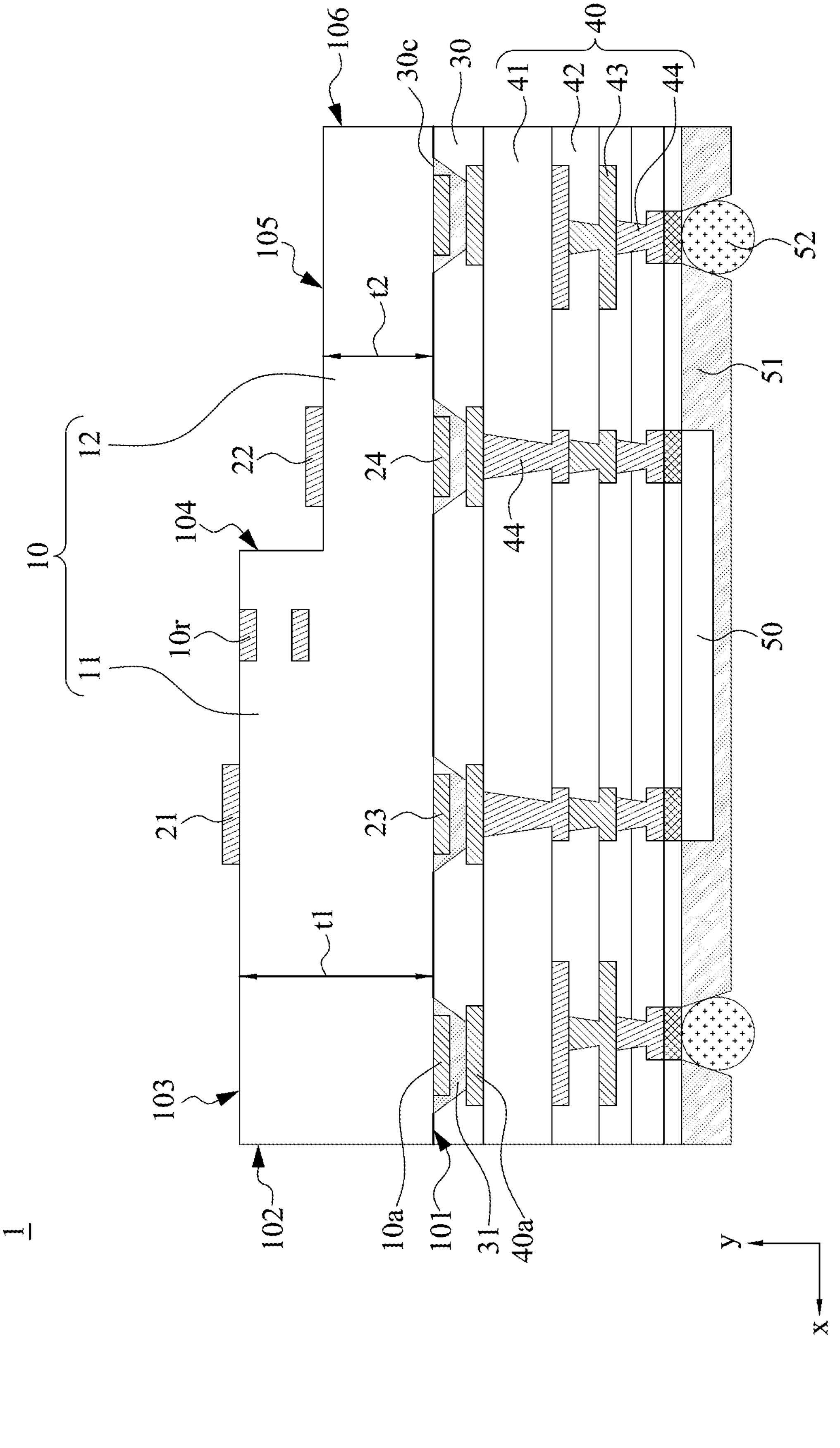
FIG. 1 illustrates a cross-sectional view of an antenna device in accordance with some embodiments of the present disclosure.

The following disclosure provides for many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

The following description involves an antenna device and a method of manufacturing an antenna device.

FIG. 1 illustrates a cross-sectional view of an antenna device 1 in accordance with some embodiments of the present disclosure. In some embodiments, the antenna device 1 may include a dielectric element 10, antennas 21, 22, 23, 24, an adhesive layer 30, a substrate 40, an electronic component 50, an encapsulation layer 51, and an electrical contact 52.

The dielectric element 10 may include a surface 101 facing the substrate 40, a surface (or upper surface) 103 opposite to the surface 101, and a surface (or upper surface) 105 opposite to the surface 101. The dielectric element 10 may also include a surface (or a lateral surface) 102 extended between the surface 101 and the surface 103, a surface (or a lateral surface) 104 extended between the surface 103 and the surface 105, and a surface (or a lateral surface) 106 extended between the surface 105 and the surface 101.

In some embodiments, the surface 101, the surface 103, and the surface 105 may be substantially parallel. In some embodiments, the surface 102, the surface 104, and the surface 106 may be substantially parallel. In some embodiments, the surface 102, the surface 104, and the surface 106 may individually be substantially perpendicular to the surface 101, the surface 103, and the surface 105. In some embodiments, the surface 103, the surface 104, and the surface 105 may define a ladder or step structure. In some embodiments, the surface 103 may protrude from the surface 105. In some embodiments, the surface 105 may be recessed from the surface 103. In some embodiments, the surface 103 and the surface 105 may have different elevations with respect to the surface 101. For example, the surface 103 and the surface 105 may be at different elevations with respect to the surface 101. For example, the surface 103 and the surface 105 may be at different distances from the surface 101. For example, the shortest distance between the surface 103 and the surface 101 may be different from the shortest distance between the surface 105 and the surface 101.

The dielectric element 10 may include a region 11 and a region 12 connected with the region 11. In some embodiments, the region 11 and the region 12 may include regions having different thicknesses. The thicknesses of the regions may include the distances (e.g., the shortest distances) between the surface 101 and a surface opposite to the surface 101. For example, a thickness t1 of the region 11 may be different from a thickness t2 of the region 12. For example, the thickness t1 of the region 11 may be greater than the thickness t2 of the region 12. In some embodiments, the dielectric element 10 may include more than two regions having different thicknesses. In some embodiments, the surface 103 may be aligned with the region 11 and the surface 105 may be aligned with the region 12.

In some embodiments, the surface 103 may be at the region 11 and the thickness t1 may be the distance (e.g., the shortest distance) between the surface 101 and the surface 103. In some embodiments, the surface 105 may be at the region 12 and the thickness t2 may be the distance (e.g., the shortest distance) between the surface 101 and the surface 105.

In some embodiments, the surface 104 of the dielectric element 10 may be configured to separate the region 11 from the region 12. For example, the region 11 is on one side of an extension line (or an imaginary extension line) of the surface 104 of the dielectric element 10, and the region 12 is on another side thereof. For example, an extension line (or an imaginary extension line) of the surface 104 is configured to divide the dielectric element 10 into the region 11 and the region 12.

In some embodiments, the dielectric element 10 may include pre-impregnated composite fibers (e.g., pre-preg), Borophosphosilicate Glass (BPSG), silicon oxide, silicon nitride, silicon oxynitride, Undoped Silicate Glass (USG), any combination of two or more thereof, or the like. In some embodiments, the dielectric element 10 may include a dielectric ceramic such as $Al_2O_3$, $Mg_2SiO_4$, $MgAl_2O_4$, $CoAl_2O_4$, or other feasible dielectric ceramics. In some embodiments, the dielectric element 10 may include thermoset plastic, which may include liquid-based organic material, and can be thermally and/or optically cured to provide adhesion ability. In some embodiments, the dielectric element 10 may include low dielectric constant (Dk) and low dissipation factor (Df) materials, such as liquid crystal polymers (LCPs). For example, the dielectric element 10 may require relatively low Dk and relatively low Df to obtain desired antenna gain and thinner thickness.

Figure 3:
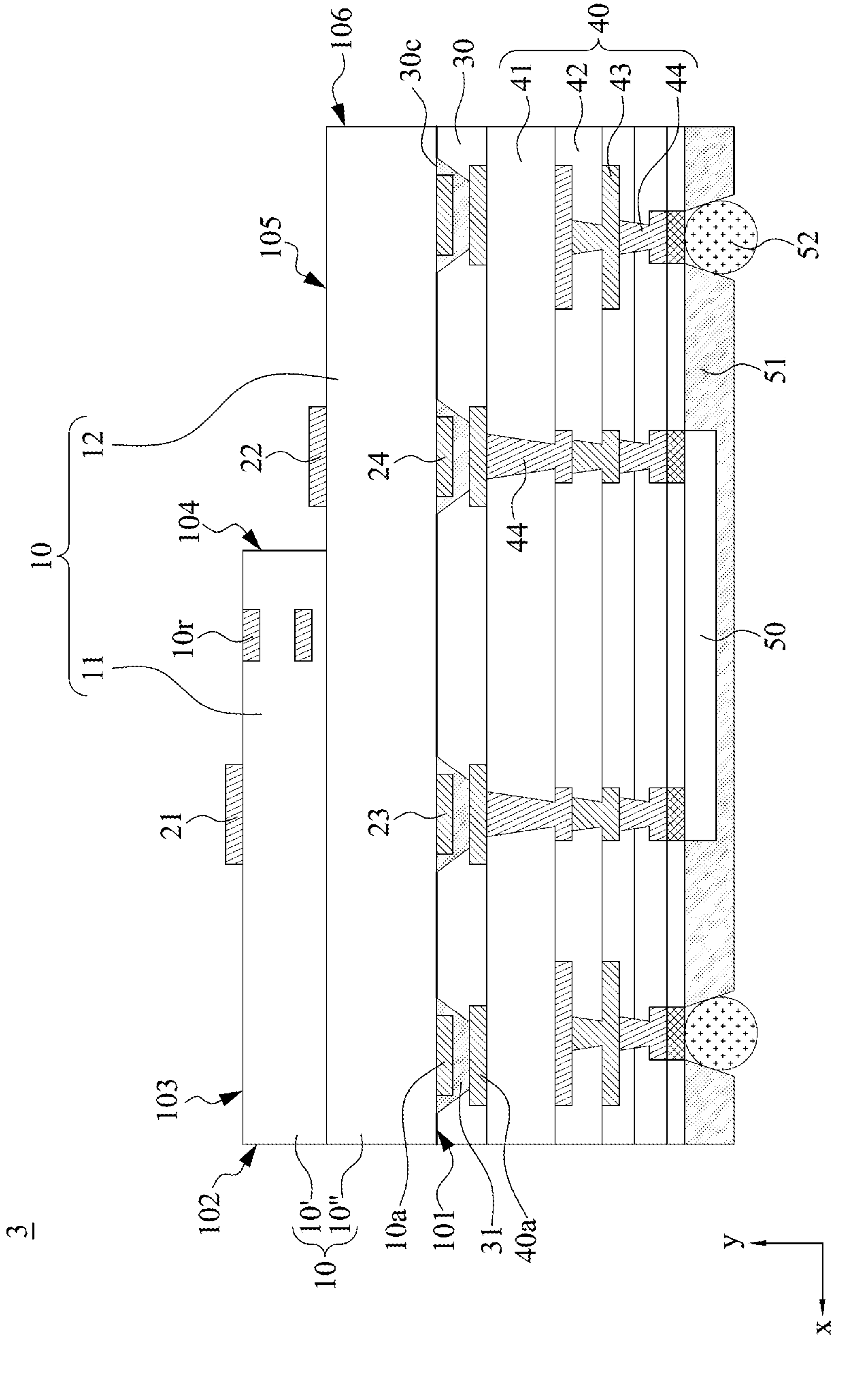
FIG. 3 illustrates a cross-sectional view of an antenna device in accordance with some embodiments of the present disclosure.
Figure 4:
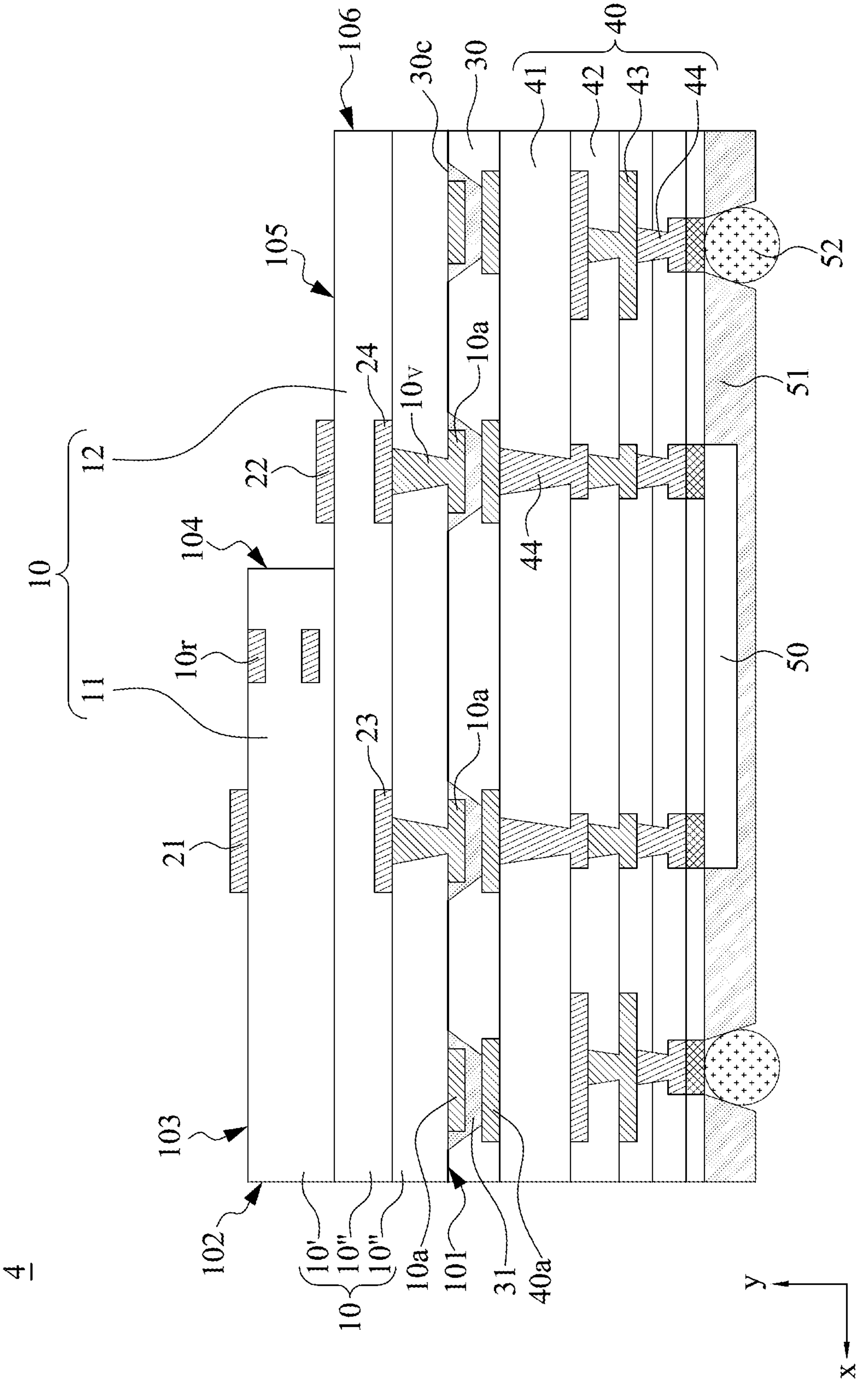
FIG. 4 illustrates a cross-sectional view of an antenna device in accordance with some embodiments of the present disclosure.

In some embodiments, the dielectric element 10 may include a single dielectric layer. For example, the dielectric element 10 may have a monolithic structure. For example, the region 11 and the region 12 may have a monolithic structure. For example, the dielectric element 10 may be integratedly formed. For example, the dielectric element 10 may be formed in one piece. However, in some other embodiments, the dielectric element 10 may include multiple dielectric layers as shown in FIGS. 3 and 4.

In some embodiments, the dielectric element 10 may include a supporting element configured to structurally support the antennas 21, 22, 23, and 24. For example, the antenna 21 may be disposed adjacent to the surface 103, the antenna 22 may be disposed adjacent to the surface 105, and the antennas (or coupling elements) 23 and 24 may be disposed adjacent to the surface 101. The antenna 21 may be in contact with the surface 103, the antenna 22 may be in contact with the surface 105, and the antennas 23 and 24 may be in contact with the surface 101. In some embodiments, the antennas 23 and 24 may be partially embedded in the dielectric element 10. In some embodiments, the antennas 23 and 24 may be or be a part of a conductive layer disposed adjacent to the surface 101.

Figure 2:
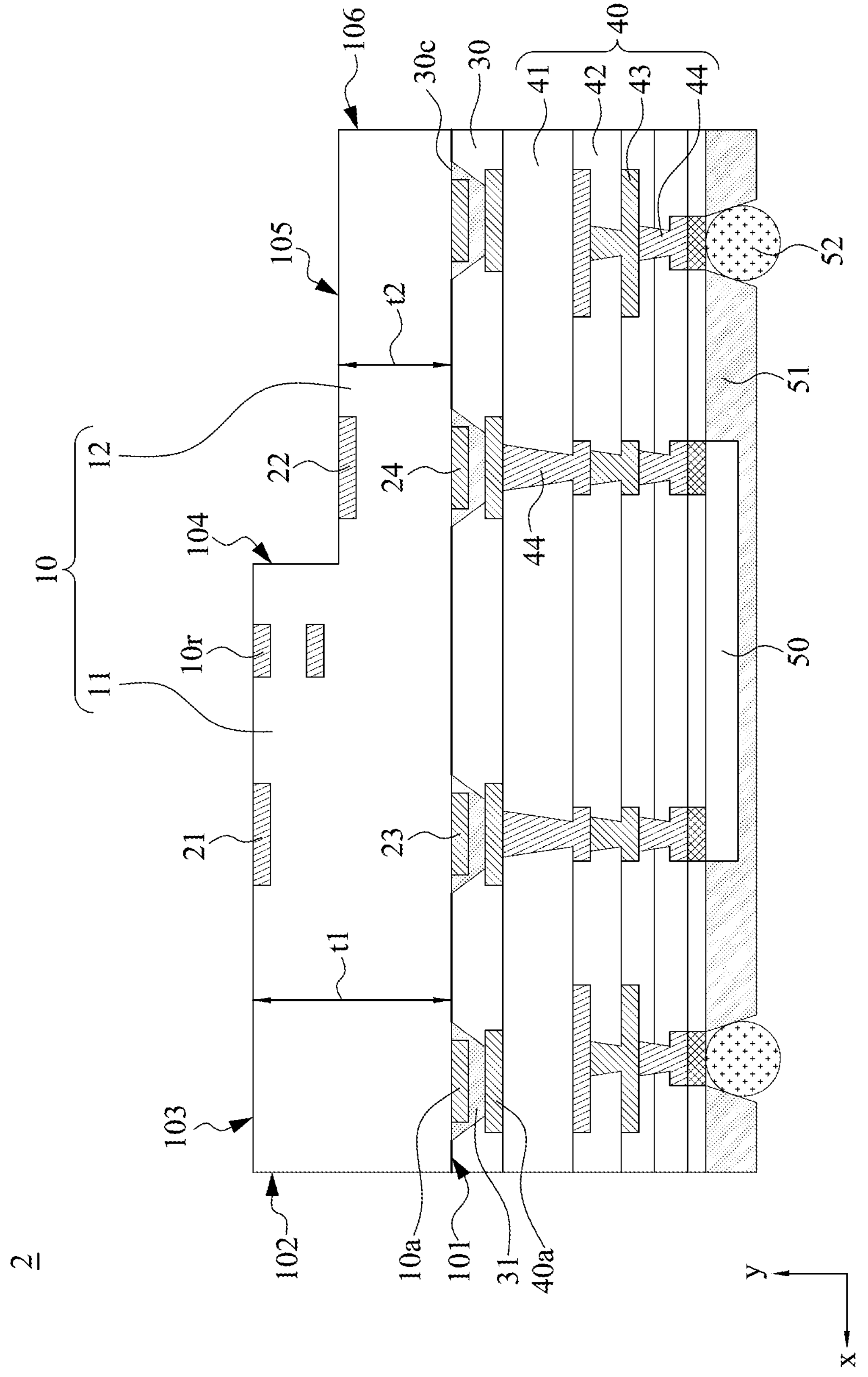
FIG. 2 illustrates a cross-sectional view of an antenna device in accordance with some embodiments of the present disclosure.

In some embodiments, the antenna 21 may protrude from the surface 103 and the antenna 22 may protrude from the surface 105. However, in some other embodiments, the antenna 21 may be substantially coplanar with the surface 103 and the antenna 22 may be substantially coplanar with the surface 105 as shown in FIG. 2.

The antenna 21 and the antenna 23 may be disposed on the region 11 of the dielectric element 10. The antenna 21 and the antenna 23 may be physically separated by the dielectric element 10. The antenna 21 may be disposed above the antenna 23. In some embodiments, the antenna 21 and the antenna 23 may be at least partially overlapping in a direction (e.g., the y axis) perpendicular to the surface 101 of the dielectric element 10. In some embodiments, the antenna 23 may include a coupling element. In some embodiments, the antenna 23 may couple to the antenna 21. In some embodiments, the antenna 23 may be configured to couple or transmit a signal into the antenna 21. In some embodiments, the electromagnetic waves radiated or transmitted by the antenna 21 may be reflected by the antenna 23. In some embodiments, the antenna 23 may be configured to be ground for reflection for the electromagnetic waves radiated by the antenna 21.

The antenna 22 and the antenna 24 may be disposed on the region 12 of the dielectric element 10. The antenna 22 and the antenna 24 may be physically separated by the dielectric element 10. The antenna 22 may be disposed above the antenna 24. In some embodiments, the antenna 22 and the antenna 24 may be at least partially overlapping in a direction (e.g., the y axis) perpendicular to the surface 101 of the dielectric element 10. In some embodiments, the antenna 24 may include a coupling element. In some embodiments, the antenna 24 may couple to the antenna 22. In some embodiments, the antenna 24 may be configured to couple or transmit a signal into the antenna 22. In some embodiments, the electromagnetic waves radiated or transmitted by the antenna 22 may be reflected by the antenna 24. In some embodiments, the antenna 24 may be configured to be ground for reflection for the electromagnetic waves radiated by the antenna 22.

The antenna 21 and the antenna 22 may have different elevations with respect to the surface 101 of the dielectric element 10. In some embodiments, the distance between the antenna 21 and the antenna 23 may be different from the distance between the antenna 22 and the antenna 24. In some embodiments, the antenna 21 and the antenna 22 may be non-overlapping in a direction (e.g., the y axis) perpendicular to the surface 101 of the dielectric element 10. In some embodiments, the antenna 21 and the antenna 22 may be non-overlapping in a direction (e.g., the x axis) parallel to the surface 101 of the dielectric element 10.

In some embodiments, the antenna 21 and the antenna 22 may be misaligned in a direction (e.g., the x axis) parallel to the surface 101 of the dielectric element 10. For example, the antenna 21 may be spaced apart from the antenna 22 in the direction of x axis. In some embodiments, the antenna 21 and the antenna 22 may be misaligned in a direction or an aspect (e.g., the y axis) perpendicular to the surface 101 of the dielectric element 10. For example, the antenna 21 may be spaced apart from the antenna 22 in the direction of the y axis.

In some embodiments, an extension line (or an imaginary extension line) of the surface 104 of the dielectric element 10 may be spaced apart from the antenna 21 and the antenna 22. For example, an extension line (or an imaginary extension line) of the surface 104 of the dielectric element 10 may not intersect with the antenna 21 and the antenna 22. For example, an extension line (or an imaginary extension line) of the surface 104 of the dielectric element 10 may not pass through the antenna 21 and the antenna 22.

In some embodiments, the antennas 21, 22, 23, and 24 may each include a patch antenna, such as a planar inverted-F antenna (PIFA) or other feasible kinds of antennas. In some embodiments, the antennas 21, 22, 23, and 24 may each include a conductive material such as a metal or metal alloy. Examples of the conductive material include gold (Au), silver (Ag), aluminum (Al), copper (Cu), platinum (Pt), Palladium (Pd), other metal(s) or alloy(s), or a combination of two or more thereof.

In some embodiments, the antenna 21 and the antenna 22 may have different frequencies (or operating frequencies) or bandwidths (or operating bandwidths). For example, the antenna 21 and the antenna 22 may be configured to radiate electromagnetic waves having different frequencies or different wavelengths. For example, the antenna 21 may have an operating frequency higher than an operating frequency of the antenna 22, or vice versa. For example, the antenna 21 may be operated in a frequency of about 39 GHz and the antenna 22 may be operated in a frequency of about 28 GHz, or vice versa. For example, the antenna 21 may be configured to radiate or receive electromagnetic waves with a frequency of about 39 GHz and the antenna 22 may be configured to radiate or receive electromagnetic waves with a frequency of about 28 GHz, or vice versa. By incorporating the antennas having different operating frequencies, the antenna device 1 may achieve multi-band (or multi-frequency) radiation. In some embodiments, the electromagnetic waves radiated by the antenna 21 may interfere (such as in a far field) with the electromagnetic waves radiated by the antenna 22, and the radiation directivity and/or the power thereof may be increased.

In some embodiments, the antenna 21 may have an operating frequency lower than an operating frequency of the antenna 22. By disposed the antenna 21 at an elevation higher than the antenna 22, the antenna gain of the antenna 21 can be enhanced. However, in some other embodiments, the antenna 21 may be disposed at an elevation lower than the antenna 22. For example, the dielectric material below the antenna 21 and the dielectric material below the antenna 21 may be adjusted to obtain desired antenna gain and thinner thickness.

According to some embodiments of the present disclosure, the antenna 21 and the antenna 22 designed at different frequencies are disposed on different regions of the antenna device 1 with different thicknesses. The different thicknesses are individually configured to meet different requirements of the antenna 21 and the antenna 22. For example, by proper adjustment of the distance between the antenna 21 and the antenna 23 (and the distance between the antenna 22 and the antenna 24), the signal transmission loss of the antenna device 1 caused by reflections can be mitigated and the gain of the antenna device 1 can be increased.

The patterns or sequences of the antennas may be different from the above descriptions, and the illustrations and the patterns or sequences of the antennas may not be limited thereto. In some embodiments, antennas of more than two different frequencies or bandwidths may be incorporated in the antenna device 1.

In some embodiments, the dielectric element 10 may further include at least one reinforced layer **10*r* configured to increase the robustness of the dielectric element 10. In some embodiments, the reinforced layer 10*r* may be at the region 11. In some other embodiments, the reinforced layer 10*r* may be at the region 12. In some embodiments, the reinforced layer 10*r* may not overlap the antennas 21, 22, 23, and 24**.

In some embodiments, the dielectric element 10 may further include at least one grounding structure (not illustrated in the figures). In some embodiments, the grounding structure may include a grounding portion adjacent to the surface 101 of the dielectric element 10 and may be electrically connected to a ground potential through the substrate 40. In some embodiments, the grounding structure may be electrically isolated from a feeding portion of the antennas 21, 22, 23, and 24. For example, the grounding structure may be or include the conductive pad 10*a*, and/or the conductive pad 40*a*. For example, the grounding structure may be a portion of the conductive pad 10*a*, and/or the conductive pad 40*a*. In some other embodiments where the dielectric element 10 has multiple dielectric layers, the grounding layer in the dielectric element 10 may be disposed on, adjacent to, or embedded in any one of the dielectric layers thereof.

In some embodiments, the surface 101 of the dielectric element 10 may be connected to the substrate 40 through the adhesive layer 30. In some embodiments, the adhesive layer 30 may be in contact with the surface 101 of the dielectric element 10. In some embodiments, the adhesive layer 30 may be in contact with the substrate 40. In some embodiments, the adhesive layer 30 may define a cavity or a recessed portion 30*c* exposing a conductive pad 40*a* of the substrate 40. In some embodiments, the cavity 30*c* defined by the adhesive layer 30 may include, but is not limited to, a sidewall inclined with respect to the substrate 40 and the dielectric element 10. For example, the cavity 30*c* may include a bowl-shaped profile with a larger aperture facing the dielectric element 10. For example, the cavity 30*c* may include a bowl-shaped profile with a smaller aperture facing the substrate 40.

In some embodiments, the adhesive layer 30 may include thermoset tape, which can be thermally and/or optically cured to provide adhesion ability. By way of example, the material of the adhesive layer 30 may be a thermoset gel including a monomer such as a resin monomer, hardener, catalyst, solvent, diluent, fillers and other additives. The gel can be thermally or optically cured to form a polymer material. The adhesive layer 30 may be softer than the substrate 40.

In some embodiments, a conductive layer 31 may be disposed in the cavity 30*c*. In some embodiments, the conductive layer 31 may be disposed between the conductive pad 40*a* of the substrate 40 and the antenna 23 to connect the conductive pad 40*a* and the antenna 23. In some embodiments, the conductive layer 31 may be disposed between the conductive pad 40*a* of the substrate 40 and the antenna 24 to connect the conductive pad 40*a* and the antenna 24. In some embodiments, the conductive layer 31 may be disposed between the conductive pad 40*a* of the substrate 40 and a conductive pad 10*a* of the dielectric element 10 to connect the conductive pad 40*a* and the conductive pad 10*a*. In some embodiments, the conductive pad 40*a* electrically connected with the antenna 23 or the antenna 24 may include a feeding portion.

In some embodiments, the material of the conductive layer 31 may include solder material such as tin (Sn), lead (Pb), silver (Ag), copper (Cu) or an alloy thereof. In some other embodiments, the material of the conductive layer 31 may include metal such as copper, silver or other suitable conductive material.

In some embodiments, the bowl-shaped profile of the cavity 30*c* may help to guide the antennas 23 and 24 and the conductive pad 10*a* of the dielectric element 10 being inserted into the cavity 30*c*, such that the antennas 23 and 24 and the conductive pad 10*a* can be accurately connected to the conductive layer 31 and the conductive pad 40*a*.

Figure 5:
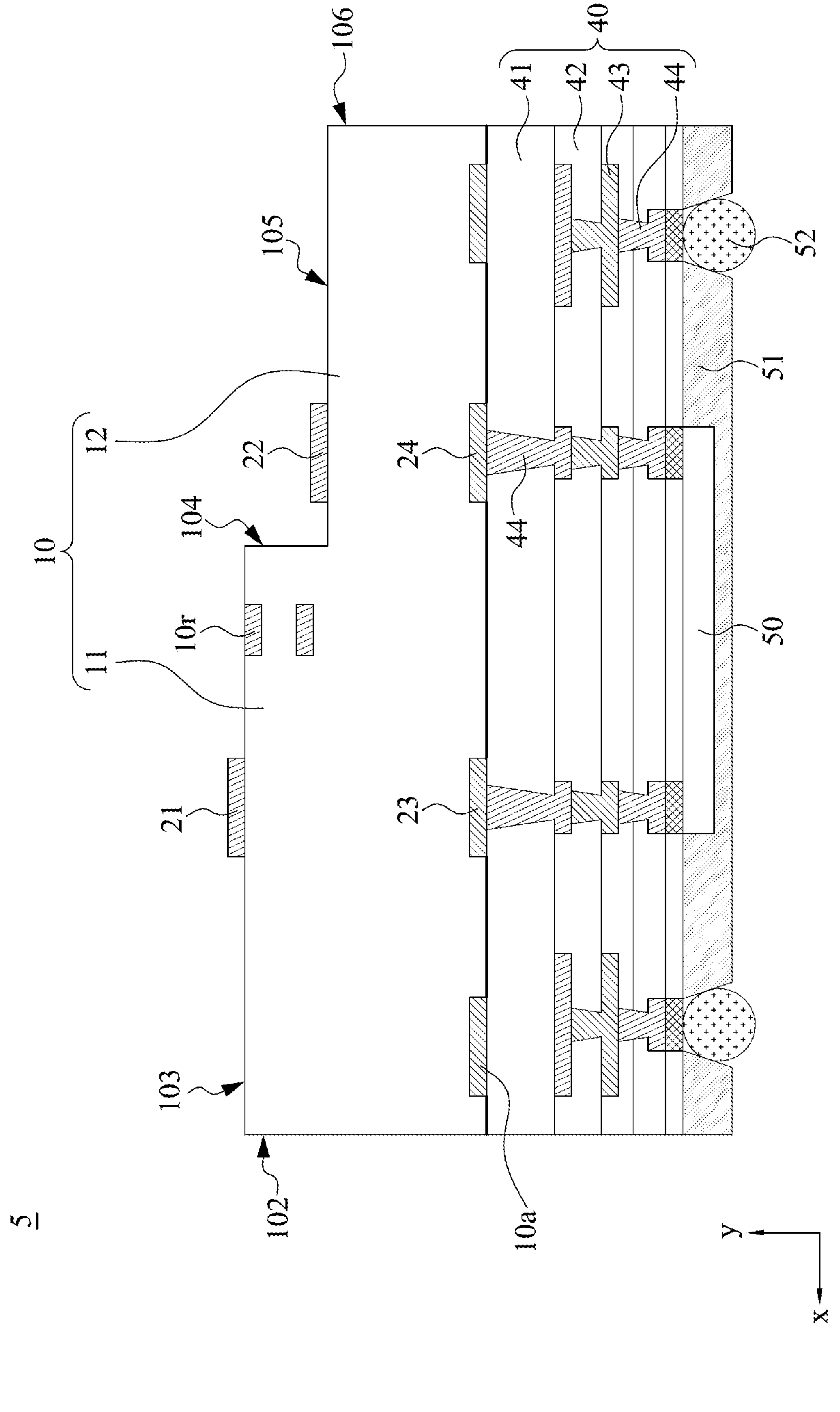
FIG. 5 illustrates a cross-sectional view of an antenna device in accordance with some embodiments of the present disclosure.

In some other embodiments, the adhesive layer 30 may be omitted and the dielectric element 10 may be in contact with the substrate 40 as shown in FIG. 5.

In some embodiments, the substrate 40 may include a package substrate such as a core substrate including a core layer 41, one or more dielectric layers 42, and one or more circuit layers 43 stacked onto one another. The circuit layers 43 may be disposed on, adjacent to, or embedded in the dielectric layers 42. The circuit layers 43 may be exposed by the dielectric layers 42. The material of each of the dielectric layers 42 may individually include organic dielectric material such as epoxy-based material (e.g., FR4), resin-based material (e.g., Bismaleimide-Triazine (BT)), Polypropylene (PP)), molding compound or other suitable materials. The dielectric layers 42 may include transparent material, semi-transparent material or opaque material. The circuit layers 43 may be configured as a redistribution layer (RDL). In some embodiments, the circuit layers 43 may be electrically connected through conductive vias 44. The material of each of the circuit layers 43 and the conductive vias 44 may individually include metal such as copper or other suitable conductive material. In some other embodiments, the substrate 40 may include a core-less substrate, and the core layer 41 can be omitted. The substrate 40 may include at least one conductive pad 40*a* disposed on a surface thereof. In some embodiments, a passivation layer (not shown in the figures) may partially cover the conductive pad 40*a*. In some embodiments, the conductive pad 40*a* may be at least partially exposed from the passivation layer.

In some embodiments, the substrate 40 may be configured as a communication substrate such as a radio frequency (RF) substrate, and the dielectric element 10 may be configured as an antenna substrate. The substrate 40 and the dielectric element 10 may be heterogeneous substrates including heterogeneous materials. The dielectric layers 42 of the substrate 40 and the dielectric element 10 may include heterogeneous materials with different characteristics. The characteristics of the substrate 40 and the dielectric element 10 may be individually configured to meet different requirements of the electronic component 50 and the antennas 21, 22, 23, and 24. For example, the Dk of the substrate 40 may be relatively higher such that the electrical requirement for the electronic component 50 can be met, while the Dk of the dielectric element 10 may be controlled to be relatively lower such that the thickness of the dielectric element 10 can be reduced, the signal transmission loss of the antenna device 1 can be mitigated, and the gain of the antenna device 1 can be increased.

In some embodiments, the electronic component 50 and the dielectric element 10 may be disposed on opposite sides of the substrate 40. The electronic component 50 may be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some embodiments, the electronic component 50 may include a transmitter, a receiver, or a transceiver. In some embodiments, the electronic component 50 may include a radio frequency IC (RFIC). In some embodiments, there may be any number of electronic components depending on design requirements. The electronic component 50 may be electrically connected to one or more of other electrical components and to the substrate 40, and the electrical connections may be attained by way of flip-chip or wire-bond techniques. The electronic component 50 may be electrically connected to the antennas 21, 22, 23, and/or 24. In some embodiments, the signal transmission path may be attained by a feeding line in the substrate 40. In some embodiments, the feeding line may include, but is not limited to, a metal pillar, a bonding wire or stacked vias.

In some embodiments, the encapsulation layer 51 may include a molding compound layer. In some embodiments, the encapsulation layer 51 may be disposed on the substrate 40 to encapsulate the electronic component 50. The encapsulation layer 51 may surround edges of the electronic component 50, and may further cover an active surface and/or an inactive surface of the electronic component 50.

In some embodiments, the electrical contact 52 may be disposed on a surface of the substrate 40 and can provide electrical connections between the antenna device 1 and external components (e.g., external circuits or circuit boards). In some embodiments, the electrical contact 52 may include a connector. In some embodiments, the electrical contact 52 may include a solder ball, such as a controlled collapse chip connection (C4) bump, a ball grid array (BGA) or a land grid array (LGA).

FIG. 2 illustrates a cross-sectional view of an antenna device 2 in accordance with some embodiments of the present disclosure. The antenna device 2 of FIG. 2 is similar to the antenna device 1 in FIG. 1 except that the antenna 21 and the antenna 22 are at least partially embedded in the dielectric element 10.

In some embodiments, the antenna 21 may be substantially coplanar with the surface 103 of the dielectric element 10. In some embodiments, the antenna 21 may be at least partially exposed from the surface 103 of the dielectric element 10. In some embodiments, the antenna 22 may be substantially coplanar with the surface 105 of the dielectric element 10. In some embodiments, the antenna 22 may be at least partially exposed from the surface 105 of the dielectric element 10.

In some embodiments, a conductive layer (not illustrated in FIG. 2) may be electrically connected between the antenna 21 and the antenna 22. In some embodiments, the conductive layer may be configured to improve the antenna performance of the antenna device 2. In some embodiments, the conductive layer may be formed on the dielectric element 10 through sputtering, electroplating, or electroless plating. In some embodiments, the conductive layer may protrude from the surface 103, the surface 104, and the surface 105.

FIG. 3 illustrates a cross-sectional view of an antenna device 3 in accordance with some embodiments of the present disclosure. The antenna device 3 of FIG. 3 is similar to the antenna device 1 in FIG. 1 except that the dielectric element 10 of the antenna device 3 includes multiple dielectric layers (such as the dielectric layers 10' and 10"). In some embodiments, the number of dielectric layers at the region 11 may be greater than the number of dielectric layers at the region 12. In some embodiments, there may be any number of dielectric layers at the region 11 and the region 12 depending on design requirements.

In some embodiments, the dielectric layers of the dielectric element 10 of the antenna device 3 may include materials with different characteristics. For example, each dielectric layer may have different materials and different characteristics from one another. In some embodiments, the dimensions, the compositions, the particle sizes, and/or the sintering temperatures of the dielectric layers at the region 11 may be adjusted to improve the antenna performance of the antenna 21. Similarly, in some embodiments, the dimensions, the compositions, the particle sizes, and/or the sintering temperatures of the dielectric layers at the region 12 may be adjusted to improve the antenna performance of the antenna 22.

FIG. 4 illustrates a cross-sectional view of an antenna device 4 in accordance with some embodiments of the present disclosure. The antenna device 4 of FIG. 4 is similar to the antenna device 3 in FIG. 3 except that the dielectric element 10 of the antenna device 4 includes more dielectric layers (such as the dielectric layers 10', 10" and 10'"). The dielectric element 10 of the antenna device 4 further includes conductive structures (such as conductive vias **10*v* and conductive pads 10*a*) connected with the antennas 23 and 24**.

In some embodiments, the conductive pads **10*a* may include feeding portions. The antenna 23 may be electrically connected with the conductive pad 10*a* through the conductive vias 10*v*. The antenna 23 and the conductive pad 10*a* may be on different dielectric layers in the dielectric element 10 of the antenna device 4. The antenna 23 may be spaced apart from the conductive layer 31 in the cavity 30*c*. Similarly, the antenna 24 may be electrically connected with the conductive pad 10*a* through the conductive vias 10*v*. The antenna 24 and the conductive pad 10*a* may be on different dielectric layers in the dielectric element 10 of the antenna device 4. The antenna 24 may be spaced apart from the conductive layer 31 in the cavity 30*c***.

FIG. 5 illustrates a cross-sectional view of an antenna device 5 in accordance with some embodiments of the present disclosure. The antenna device 5 of FIG. 5 is similar to the antenna device 1 in FIG. 1 except that the antenna device 5 does not include the adhesive layer 30 in antenna device 1.

In some embodiments, the dielectric element 10 may directly contact the substrate 40. In some embodiments, the conductive pad **10*a* of the dielectric element 10 may be at least partially embedded in the dielectric element 10. In some embodiments, the antenna 23 and the antenna 24 may be at least partially embedded in the dielectric element 10. In some embodiments, the antenna 23 and the antenna 24 may be at least partially exposed from the dielectric element 10 to be electrically connected with the circuit layers 43 and the conductive vias 44 in the substrate 40**.

Figure 6:
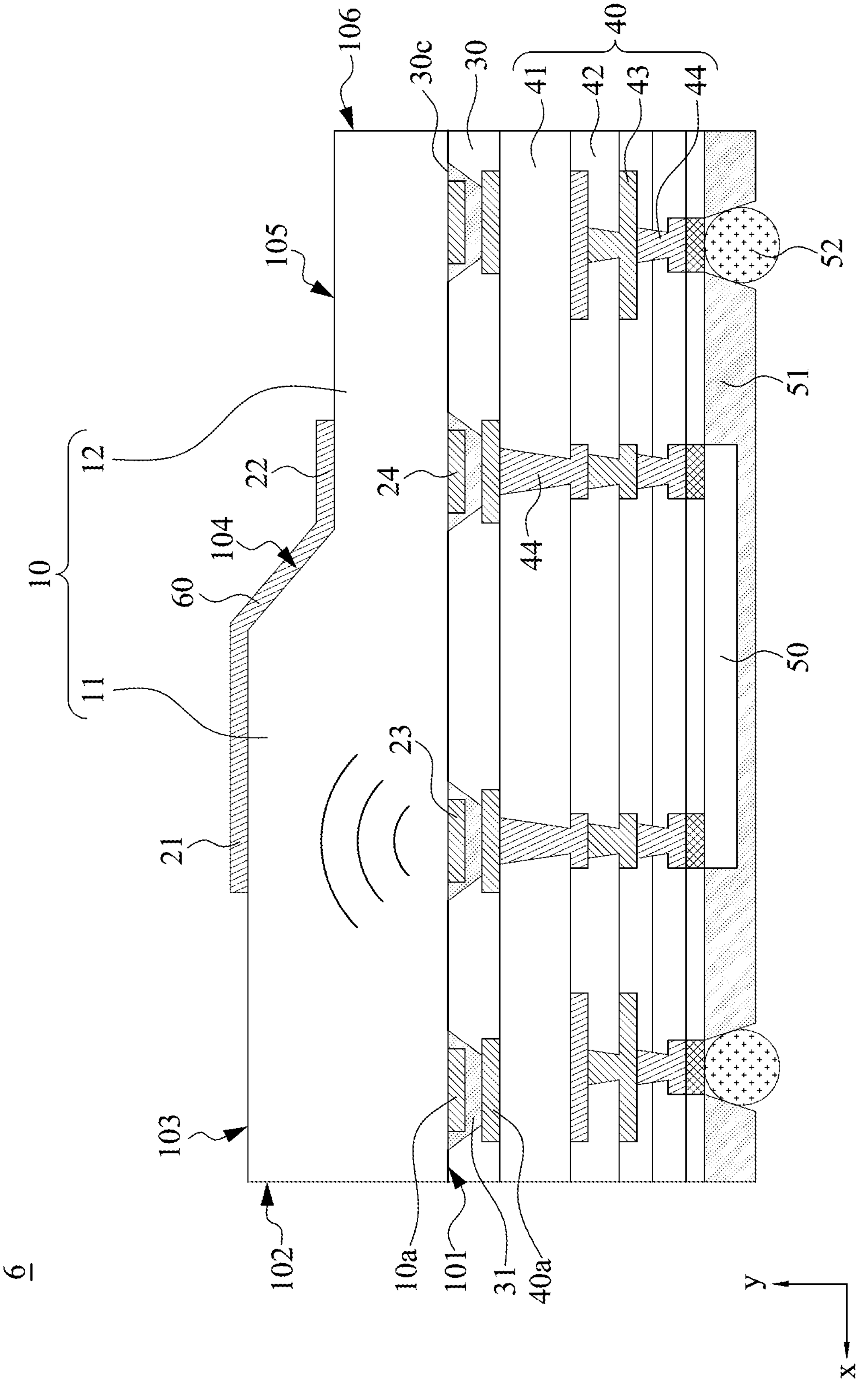
FIG. 6 illustrates a cross-sectional view of an antenna device in accordance with some embodiments of the present disclosure.

FIG. 6 illustrates a cross-sectional view of an antenna device 6 in accordance with some embodiments of the present disclosure. The antenna device 6 of FIG. 6 is similar to the antenna device 1 in FIG. 1 except that the surface 104 of the dielectric element 10 of the antenna device 6 is non-perpendicular with respect to the surfaces 103 and 105. For example, the surface 104 may be inclined with respect to the surfaces 103 and 105.

In some embodiments, the antenna device 6 may further include a conductive layer 60 disposed on the surface 104. In some embodiments, the non-perpendicular surface 104 may facilitate the sputtering, electroplating, or electroless plating for the conductive layer 60. In some embodiments, the conductive layer 60 may electrically connect the antenna 21 with the antenna 22. In some embodiments, the conductive layer 60 may be configured to collect or conduct the electromagnetic waves of the antenna 21 and the antenna 22.

In some embodiments, the conductive layer 60 may be configured to reflect a portion of the electromagnetic waves transmitted by the antenna 22. Therefore, the radiation directivity and/or the power thereof may be increased.

Figure 7:
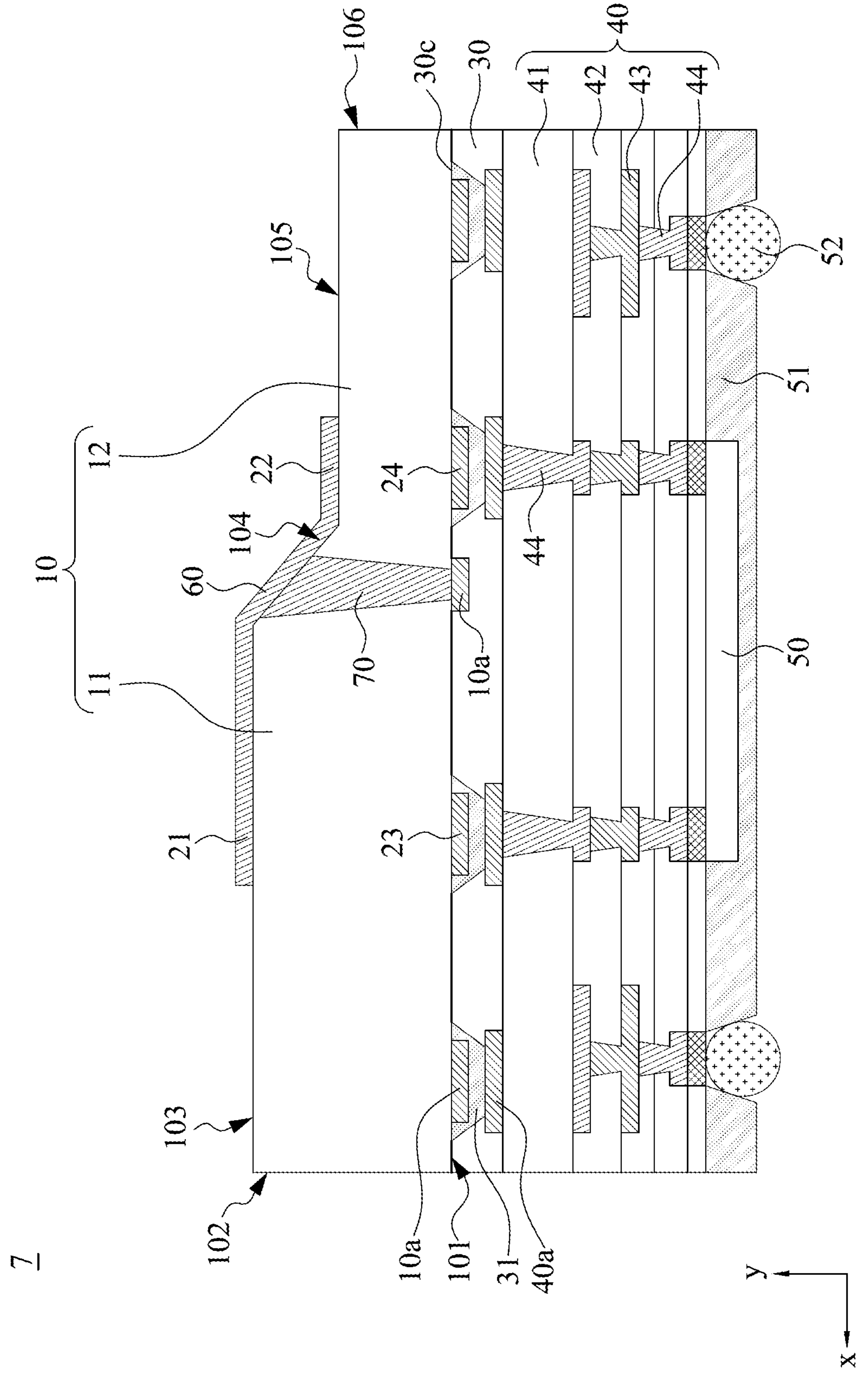
FIG. 7 illustrates a cross-sectional view of an antenna device in accordance with some embodiments of the present disclosure.

FIG. 7 illustrates a cross-sectional view of an antenna device 7 in accordance with some embodiments of the present disclosure. The antenna device 7 of FIG. 7 is similar to the antenna device 6 in FIG. 6 except that the antenna device 7 further includes a conductive via 70 within the dielectric element 10 and electrically connects the conductive layer 60 with the substrate 40.

In some embodiments, the conductive via 70 may penetrate through the dielectric element 10. In some embodiments, the conductive via 70 may extend between the surface 104 and the surface 101. In some embodiments, the conductive via 70 may taper toward the surface 101. In some other embodiments, the conductive via 70 may taper toward the surface 104.

In some embodiments, the conductive via 70 may be in contact with the conductive layer 60. In some embodiments, the conductive via 70 may be in contact with the conductive pad 10*a* of the dielectric element 10. In some embodiments, the conductive pad 10*a* contacting the conductive via 70 may include a feeding portion. In some embodiments, the conductive via 70 may include a feeding line. In some embodiments, the conductive via 70 may be electrically connected with the circuit layers 43 and the conductive vias 44 in the substrate 40.

In some embodiments, the grounding layer in the dielectric element 10 may be electrically insulated from the conductive via 70. In some embodiments, the grounding layer in the dielectric element 10 may surround the conductive via 70. In some embodiments, as stated above, the grounding layer in the dielectric element 10 may be adjacent to the surface 101 of the dielectric element 10. In some other embodiments where the dielectric element 10 has multiple dielectric layers, the grounding layer in the dielectric element 10 may be disposed on, adjacent to, or embedded in any one of the dielectric layers.

Figure 8:
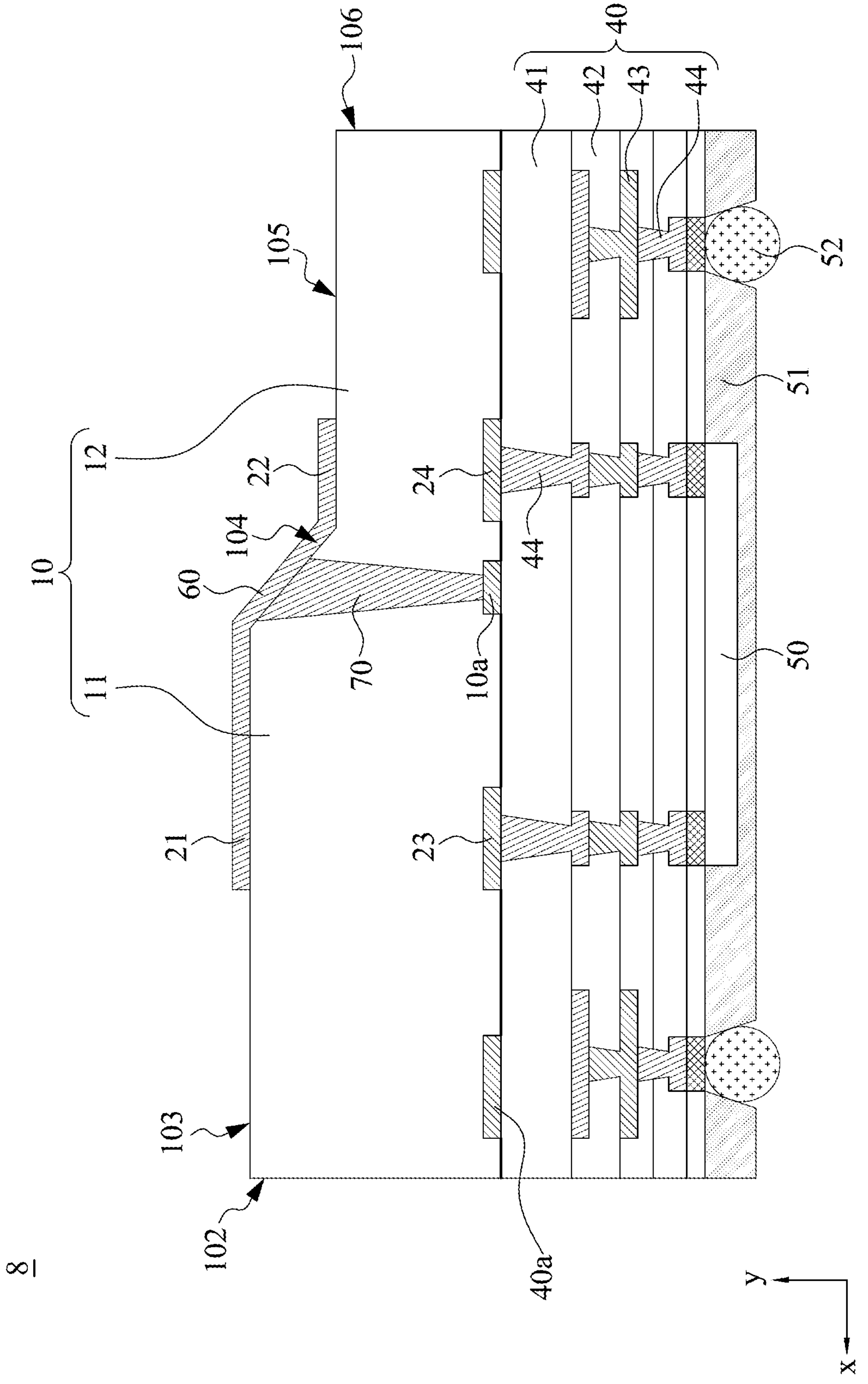
FIG. 8 illustrates a cross-sectional view of an antenna device in accordance with some embodiments of the present disclosure.

FIG. 8 illustrates a cross-sectional view of an antenna device 8 in accordance with some embodiments of the present disclosure. The antenna device 8 of FIG. 8 is similar to the antenna device 7 in FIG. 7 except that the antenna device 8 does not include the adhesive layer 30 of antenna device 7.

Figure 9:
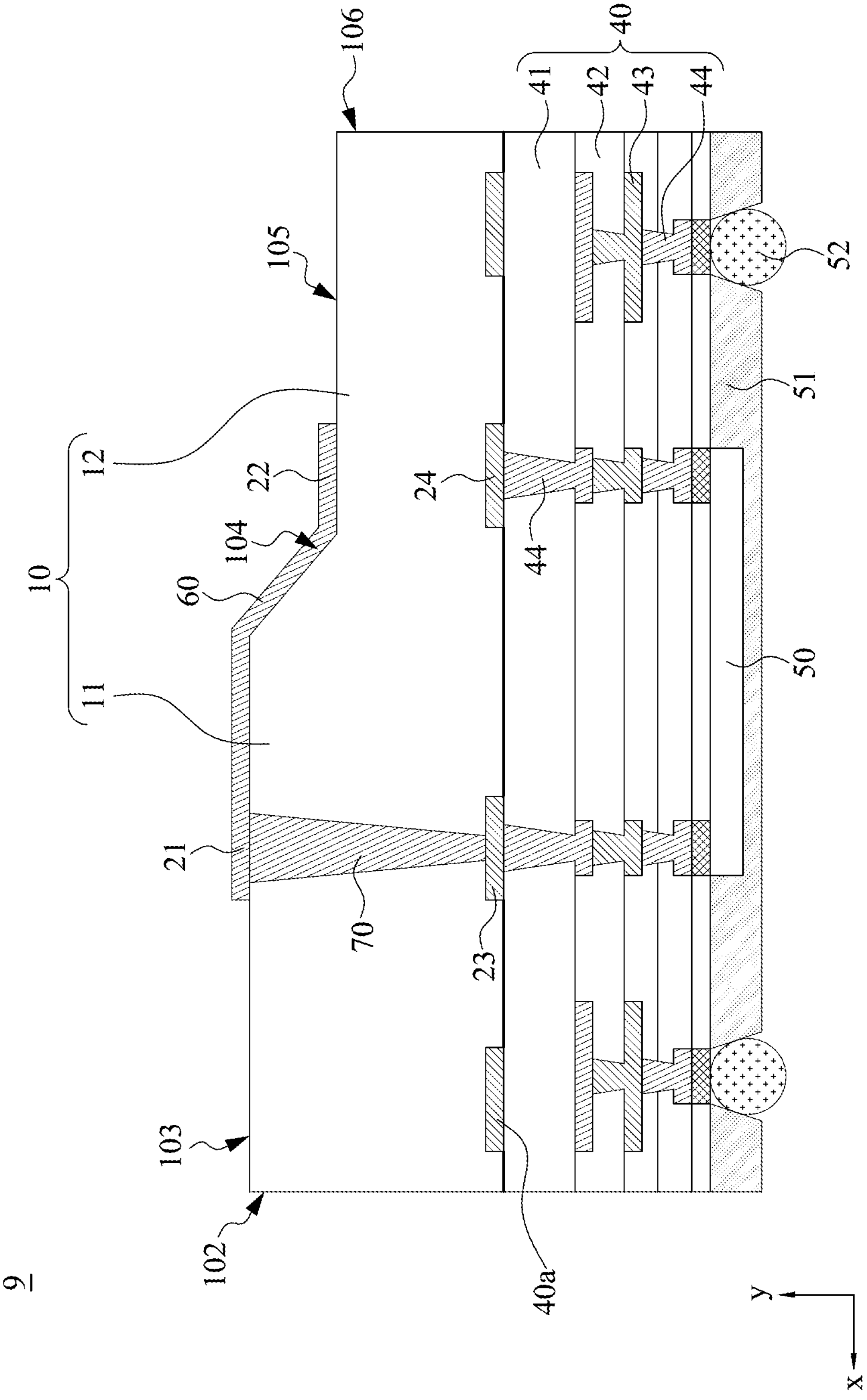
FIG. 9 illustrates a cross-sectional view of an antenna device in accordance with some embodiments of the present disclosure.

FIG. 9 illustrates a cross-sectional view of an antenna device 9 in accordance with some embodiments of the present disclosure. The antenna device 9 of FIG. 9 is similar to the antenna device 8 in FIG. 8 except that the conductive via 70 is electrically connected with the antenna 21 and the antenna 23. In some embodiments, the conductive via 70 may extend between the surface 103 and the surface 101.

In some other embodiments, the conductive via 70 may be electrically connected with the antennas 22 and 24. In some other embodiments, the conductive via 70 may extend between the surface 105 and the surface 101.

Figure 10:
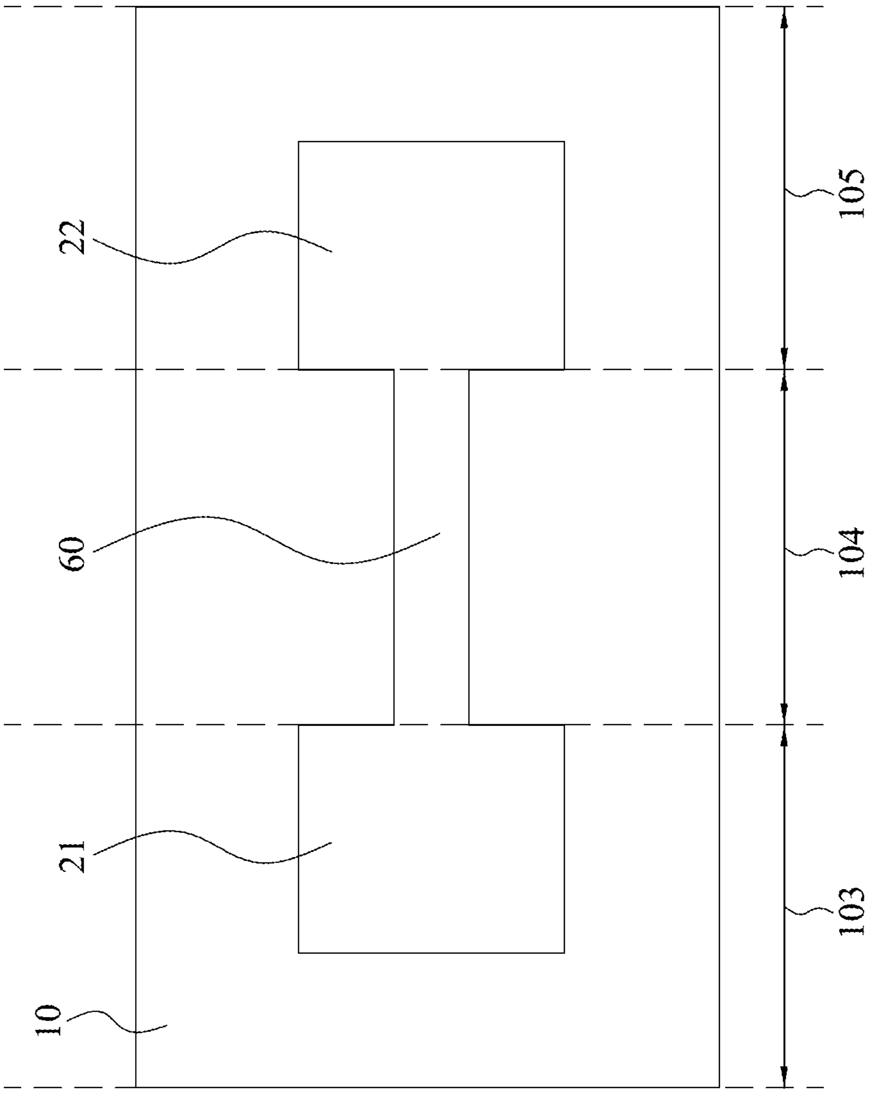
FIG. 10 illustrates a top view of an antenna device in accordance with some embodiments of the present disclosure.

FIG. 10 illustrates a top view of an antenna device in accordance with some embodiments of the present disclosure. In some embodiments, FIG. 10 illustrates a top view of the antenna device 6 of FIG. 6, the antenna device 7 of FIG. 7, the antenna device 8 of FIG. 8, and the antenna device 9 of FIG. 9.

In some embodiments, the conductive layer 60 at the surface 104 may electrically connect the antenna 21 at the surface 103 with the antenna 22 at the surface 105. In some embodiments, the relative dimensions of the conductive layer 60, the antenna 21, the antenna 22, and the dielectric element 10 are for illustrative purposes only. The present invention is not limited thereto.

Figure 11A:
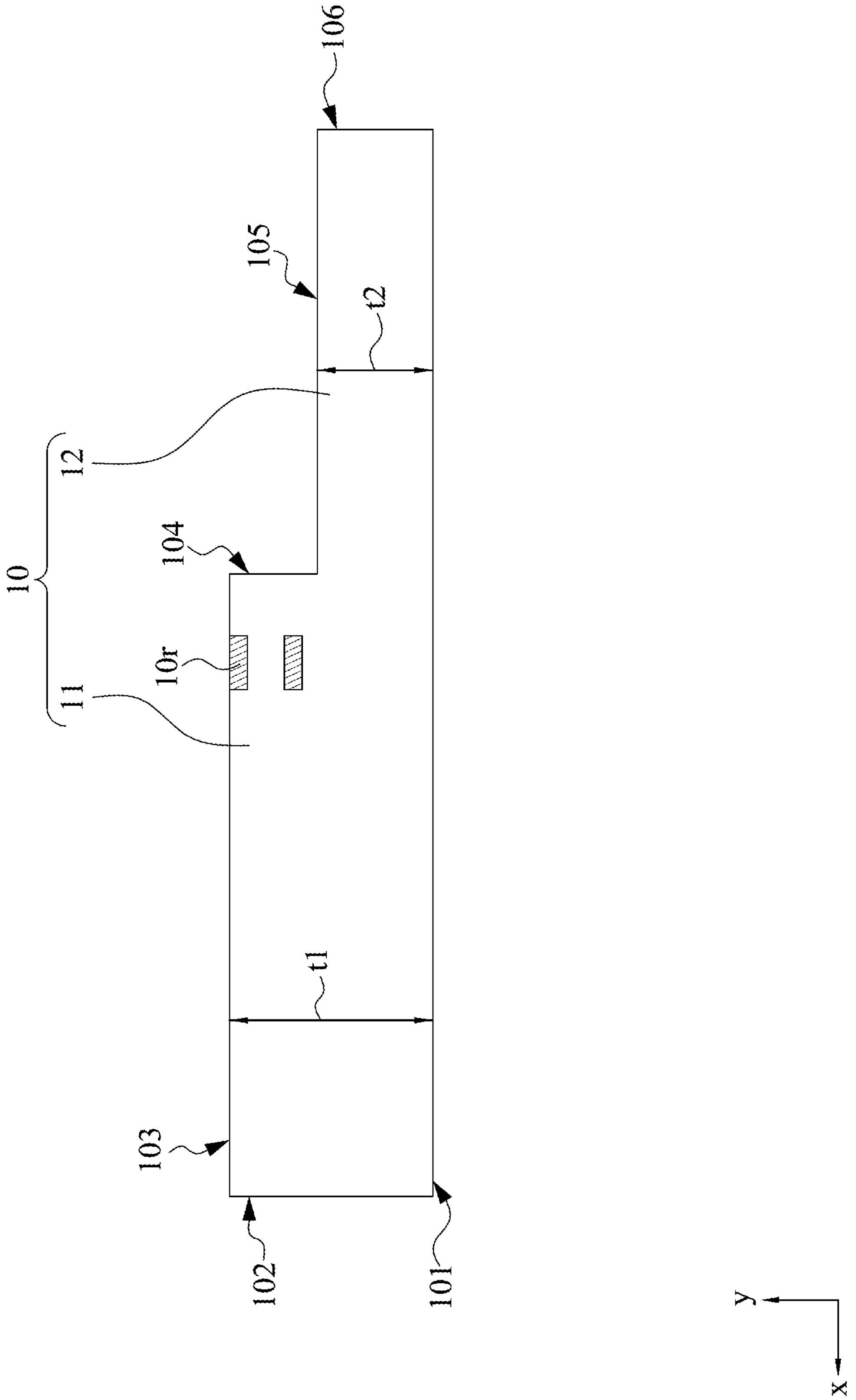
FIG. 11A illustrates one or more stages of a method of manufacturing an antenna device in accordance with some embodiments of the present disclosure.
Figure 11B:
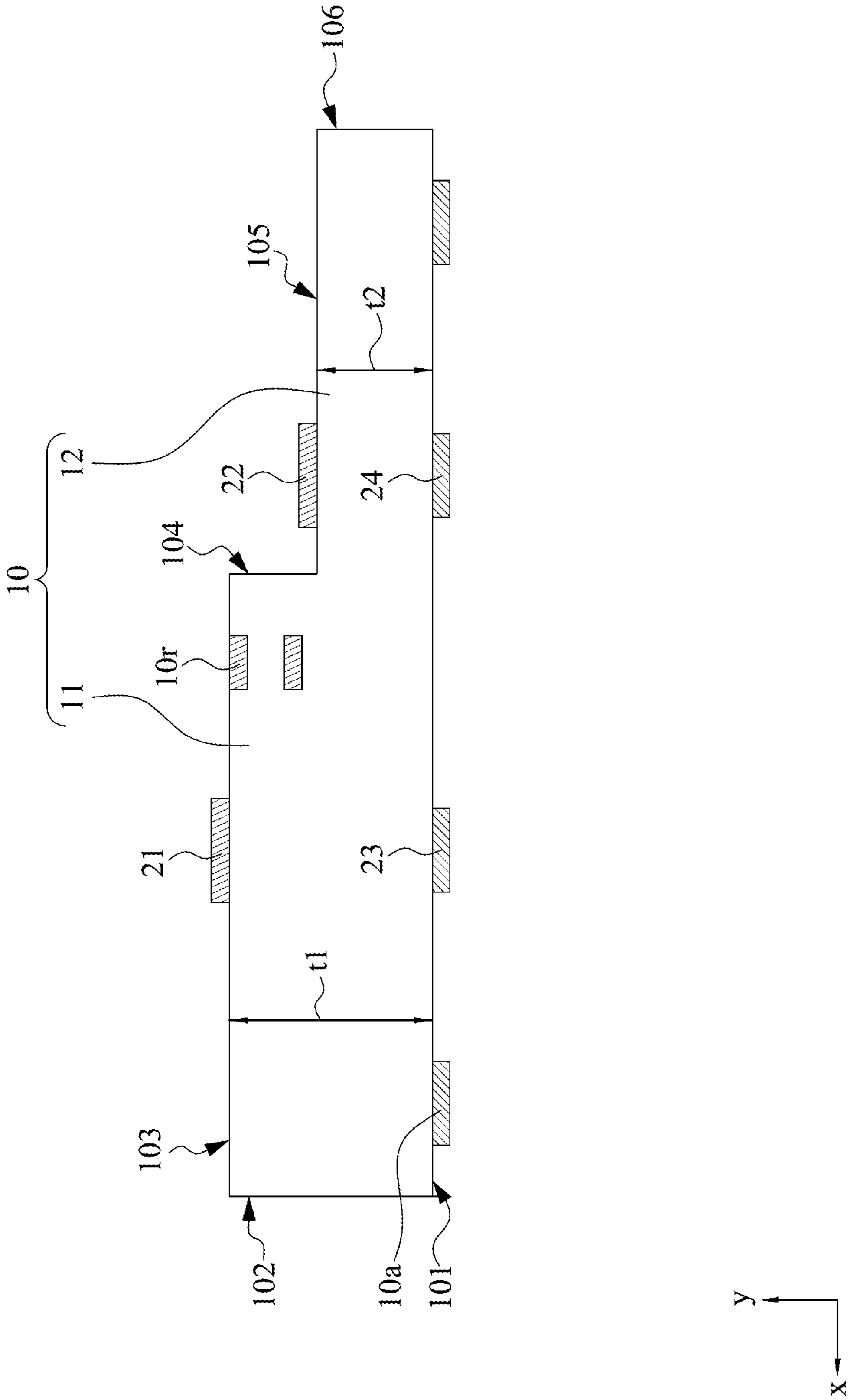
FIG. 11B illustrates one or more stages of a method of manufacturing an antenna device in accordance with some embodiments of the present disclosure.
Figure 11C:
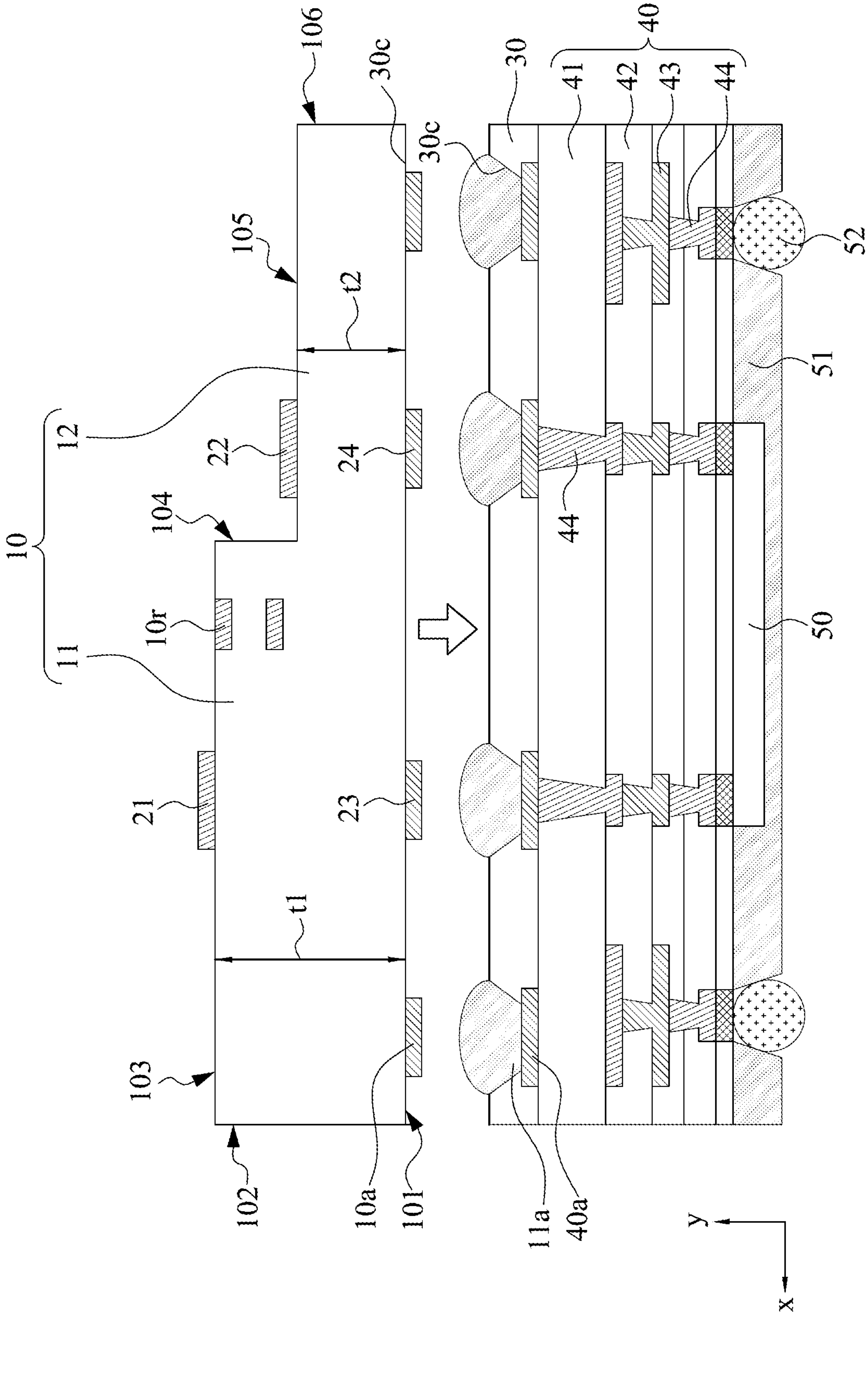
FIG. 11C illustrates one or more stages of a method of manufacturing an antenna device in accordance with some embodiments of the present disclosure.

FIGS. 11A, 11B, and 11C illustrate stages of a method of manufacturing an antenna device in accordance with some embodiments of the present disclosure. In some embodiments, the antenna device 1 in FIG. 1 may be manufactured by the operations described below with respect to the FIGS. 11A, 11B, and 11C.

Referring to FIG. 11A, the dielectric element 10 may be provided. In some embodiments, the dielectric element 10 may be integratedly formed such that the region 11 and the region 12 may have a monolithic structure. In some embodiments, the dielectric element 10 may be formed by a molding tool. In some embodiments, the dielectric element 10 may be formed by injection molding, compression molding, transfer molding, and so on.

Referring to FIG. 11B, the antennas 21, 22, 23, and 24 may be formed on the dielectric element 10 by sputtering, electroplating, or electroless plating. The antennas 21 and 23 may be formed on the region 11. The antennas 22 and 24 may be formed on the region 12. The antenna 21 and the antenna 22 may be formed on the region 11 and the region 12, respectively, such that the antenna 21 and the antenna 22 may have different elevations with respect to the surface 101 of the dielectric element 10. In some embodiments, at least one conductive pad 10*a* of the dielectric element 10 may be formed in the same operations of the antennas 23 and 24.

Referring to FIG. 11C, the substrate 40 may be provided and the dielectric element 10 (with the antennas) may be attached to the substrate 40 through the adhesive layer 30.

In some embodiments, the adhesive layer 30 may be provided one the substrate 40. The adhesive layer 30 may then be patterned to form the cavity 30*c* exposing the conductive pad 40*a* of the substrate 40. In some embodiments, the adhesive layer 30 may be patterned by drilling such as laser drilling. As shown in FIG. 11C, the conductive layer 11*a* may be formed in the cavity 30*c* on the conductive pad 40*a* exposed from the passivation layer (not shown in the figures) and the adhesive layer 30.

Figure 12A:
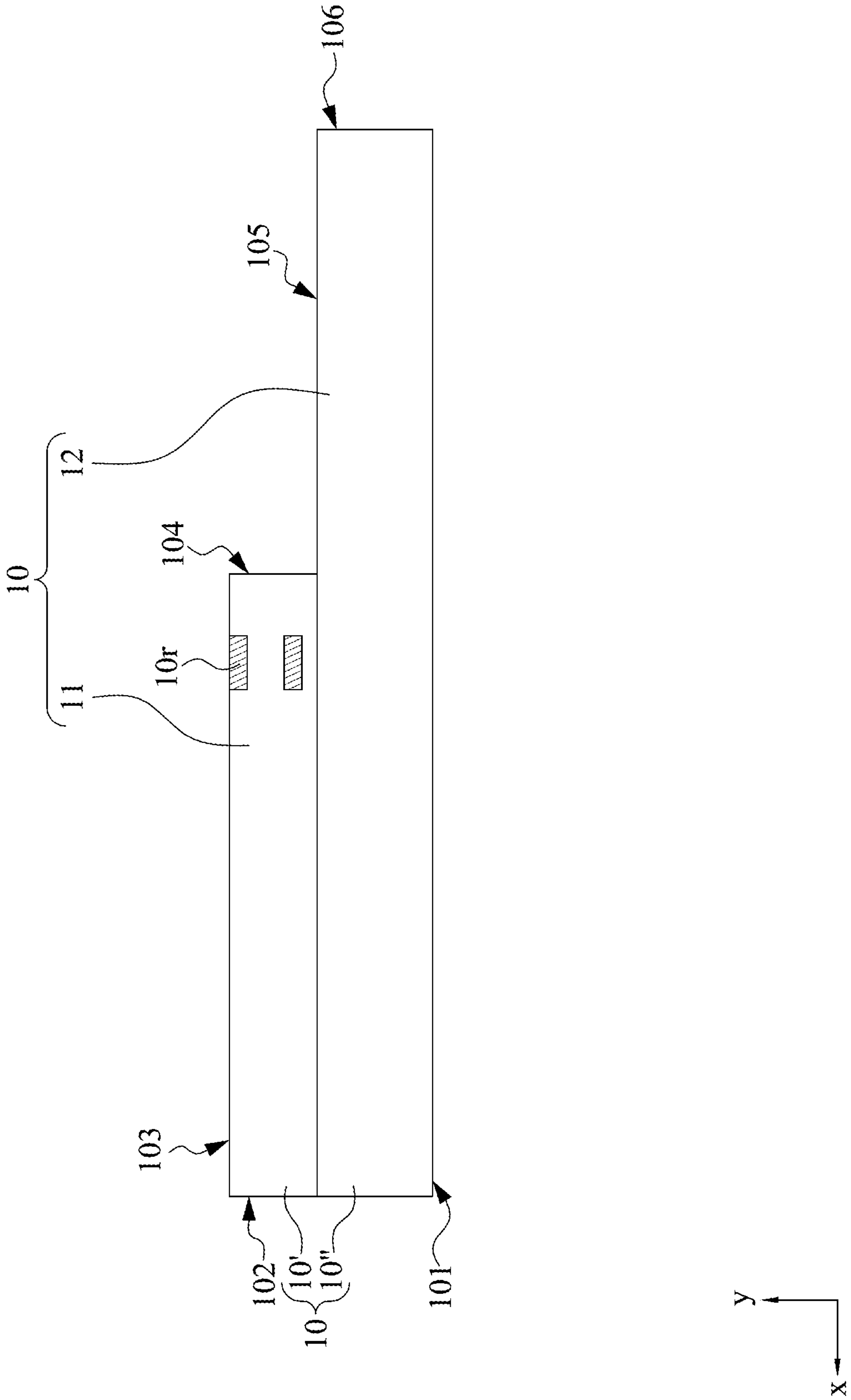
FIG. 12A illustrates one or more stages of a method of manufacturing an antenna device in accordance with some embodiments of the present disclosure.
Figure 12B:
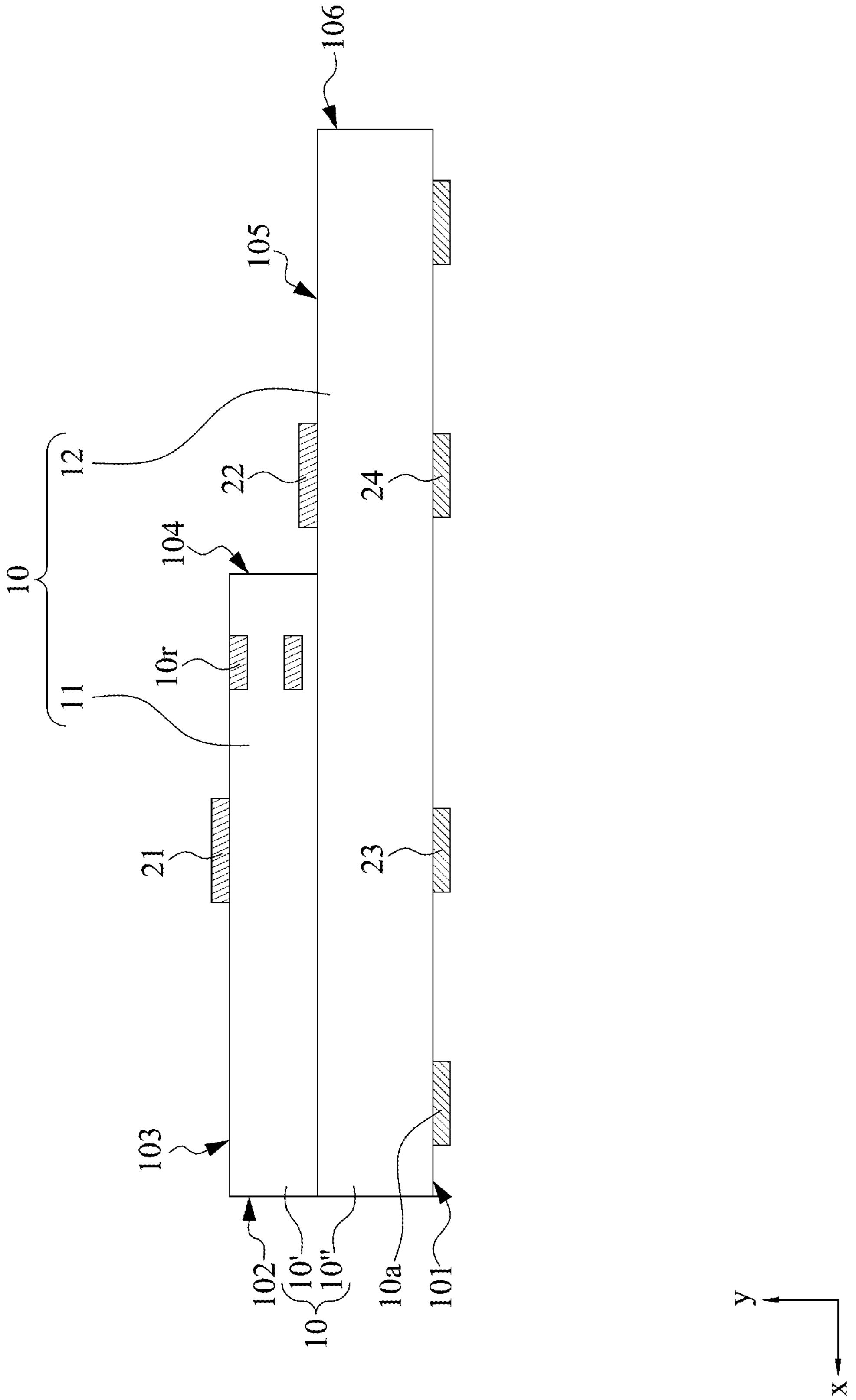
FIG. 12B illustrates one or more stages of a method of manufacturing an antenna device in accordance with some embodiments of the present disclosure.
Figure 12C:
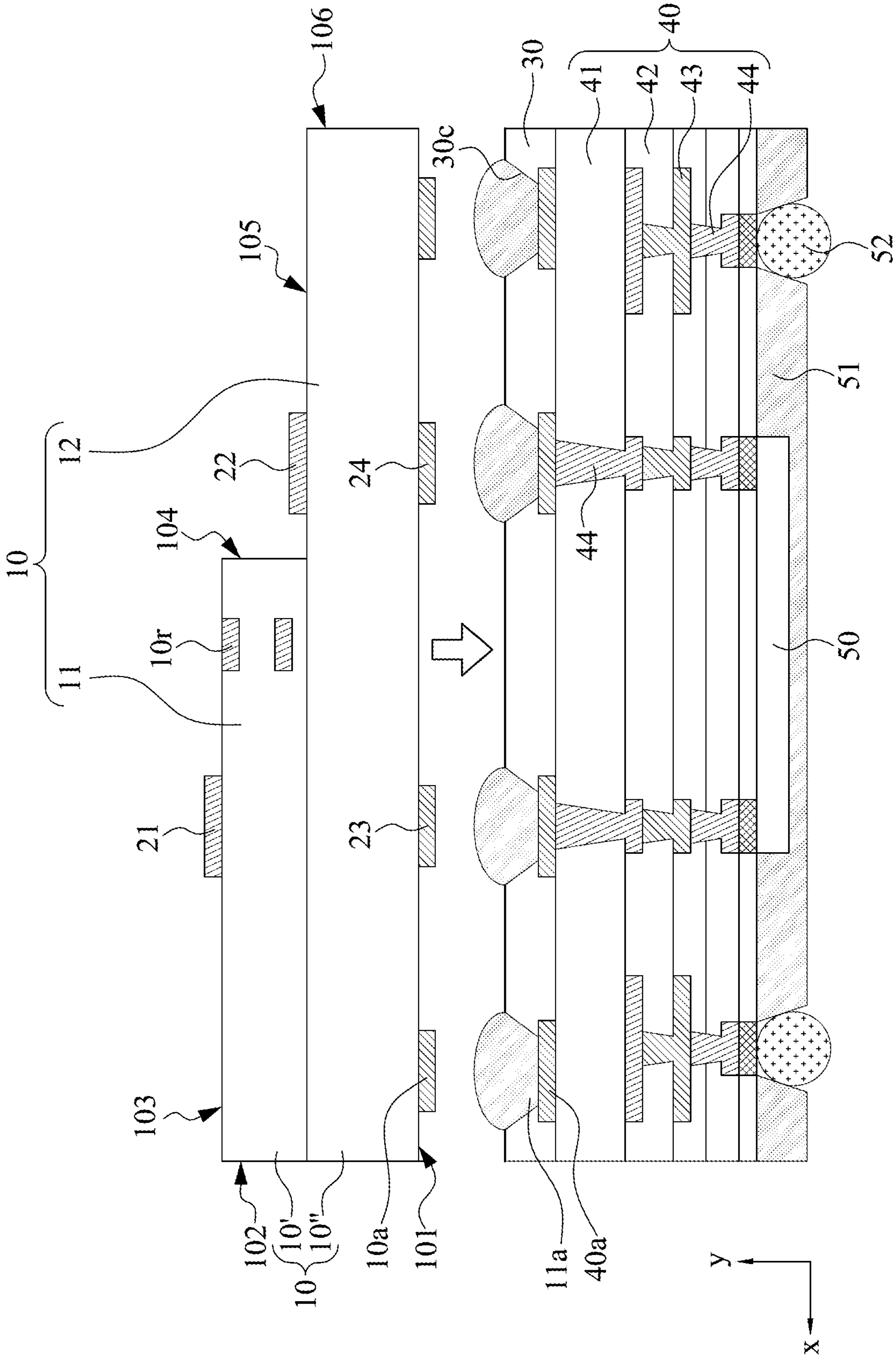
FIG. 12C illustrates one or more stages of a method of manufacturing an antenna device in accordance with some embodiments of the present disclosure.

FIGS. 12A, 12B, and 12C illustrate stages of a method of manufacturing an antenna device in accordance with some embodiments of the present disclosure. In some embodiments, the antenna device 3 in FIG. 3 may be manufactured by the operations described below with respect to FIGS. 12A, 12B, and 12C.

Referring to FIG. 12A, the dielectric element 10 may be provided. In some embodiments, the dielectric element 10 may be formed by stacking multiple dielectric layers (such as the dielectric layers 10' and 10"). In some embodiments, conductive structures (such as the conductive vias 10*v* and the conductive pads 10*a* in FIG. 4) may be formed on the dielectric layers.

The operations in FIG. 12B and FIG. 12C may be similar to the operations in FIG. 11B and FIG. 11C, respectively, and are not repeated hereafter for conciseness.

Figure 13A:
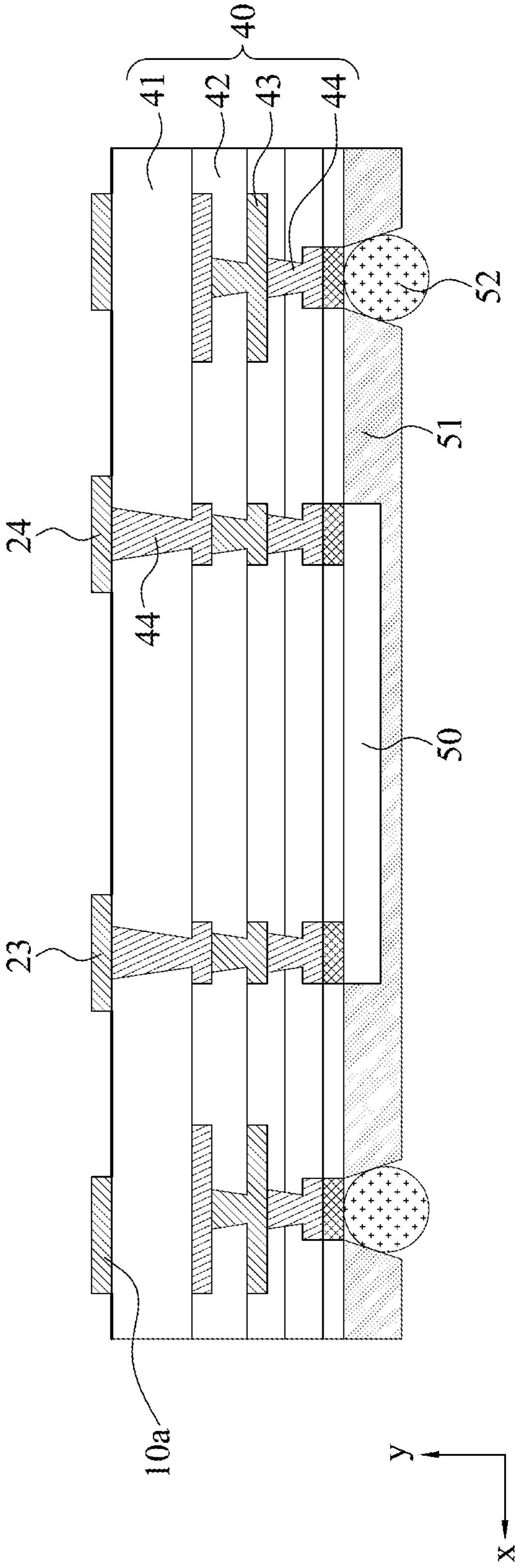
FIG. 13A illustrates one or more stages of a method of manufacturing an antenna device in accordance with some embodiments of the present disclosure.
Figure 13B:
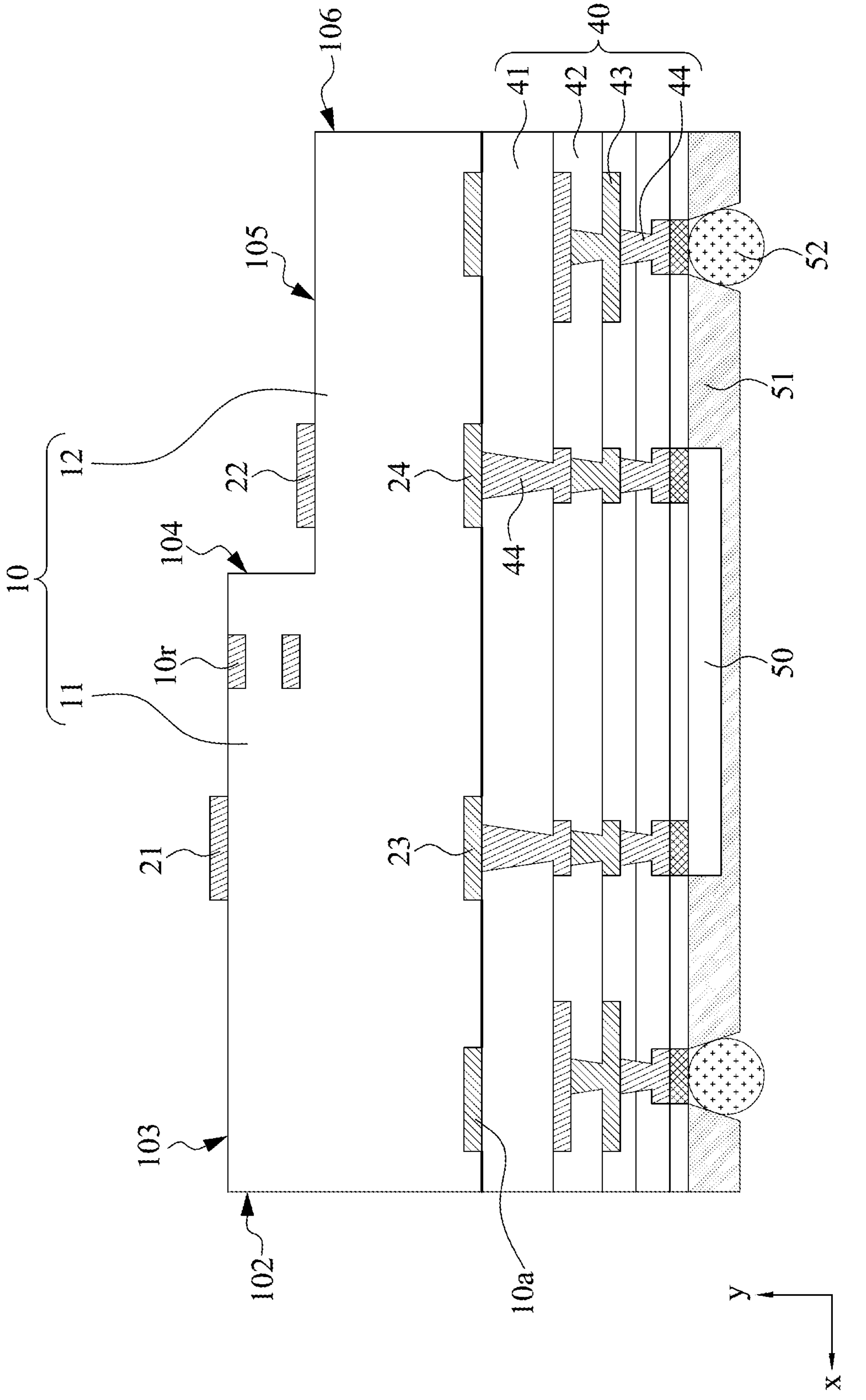
FIG. 13B illustrates one or more stages of a method of manufacturing an antenna device in accordance with some embodiments of the present disclosure.

FIGS. 13A and 13B illustrate stages of a method of manufacturing an antenna device in accordance with some embodiments of the present disclosure. In some embodiments, the antenna device 5 in FIG. 5 may be manufactured by the operations described below with respect to FIGS. 13A and 13B.

Referring to FIG. 13A, the conductive pad 10*a*, the antenna 23, and the antenna 24 may be pre-formed on the substrate 40 before forming the dielectric element 10 on the substrate 40.

Referring to FIG. 13B, the dielectric element 10 may be formed on the substrate 40 through a lamination operation. In some embodiments, the antenna 21 and the antenna 22 may be pre-formed on the dielectric element 10 before forming the dielectric element 10 on the substrate 40. In some other embodiments, the antenna 21 and the antenna 22 may be formed on the dielectric element 10 after forming the dielectric element 10 on the substrate 40.

Figure 14A:
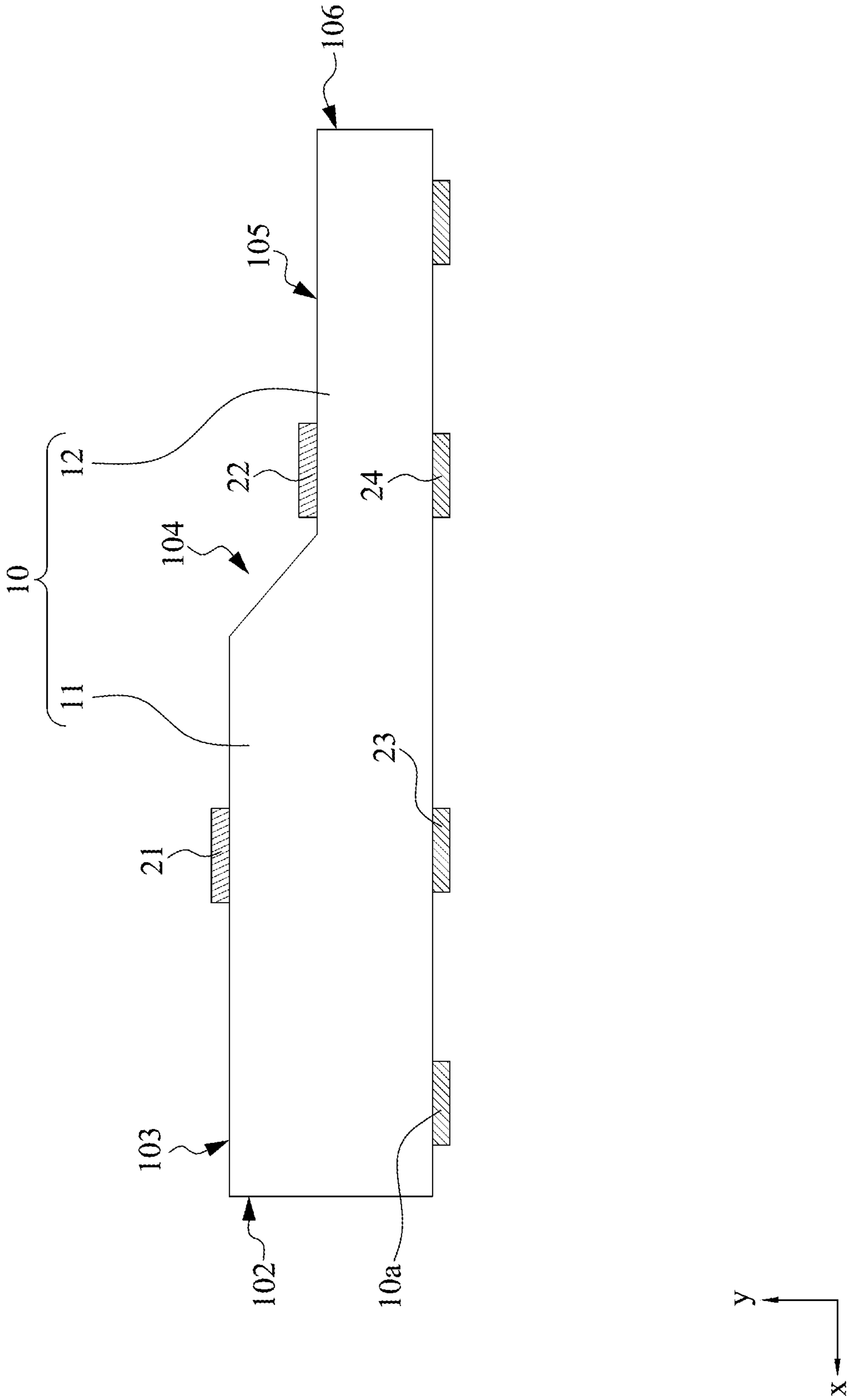
FIG. 14A illustrates one or more stages of a method of manufacturing an antenna device in accordance with some embodiments of the present disclosure.
Figure 14B:
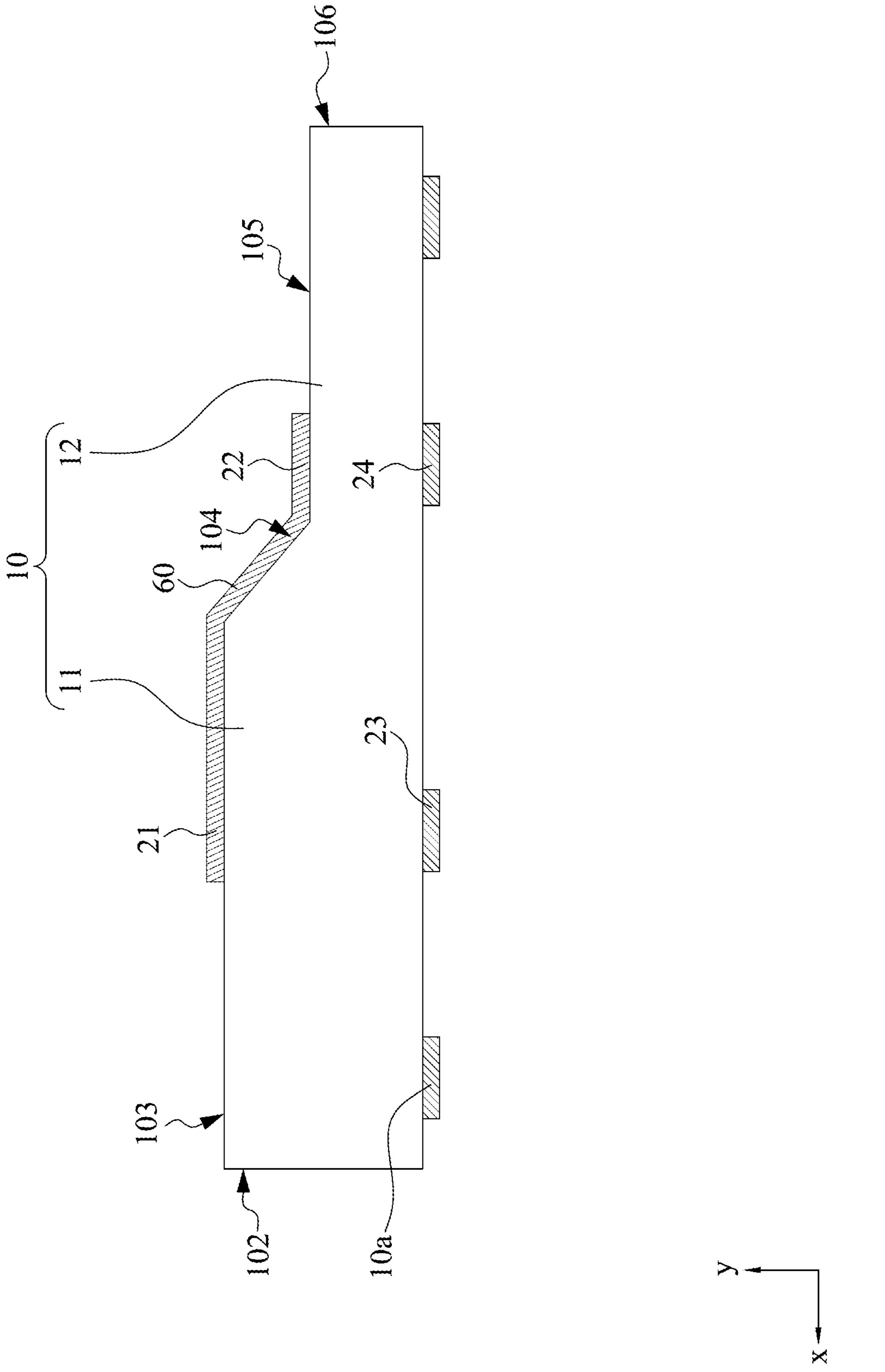
FIG. 14B illustrates one or more stages of a method of manufacturing an antenna device in accordance with some embodiments of the present disclosure.
Figure 14C:
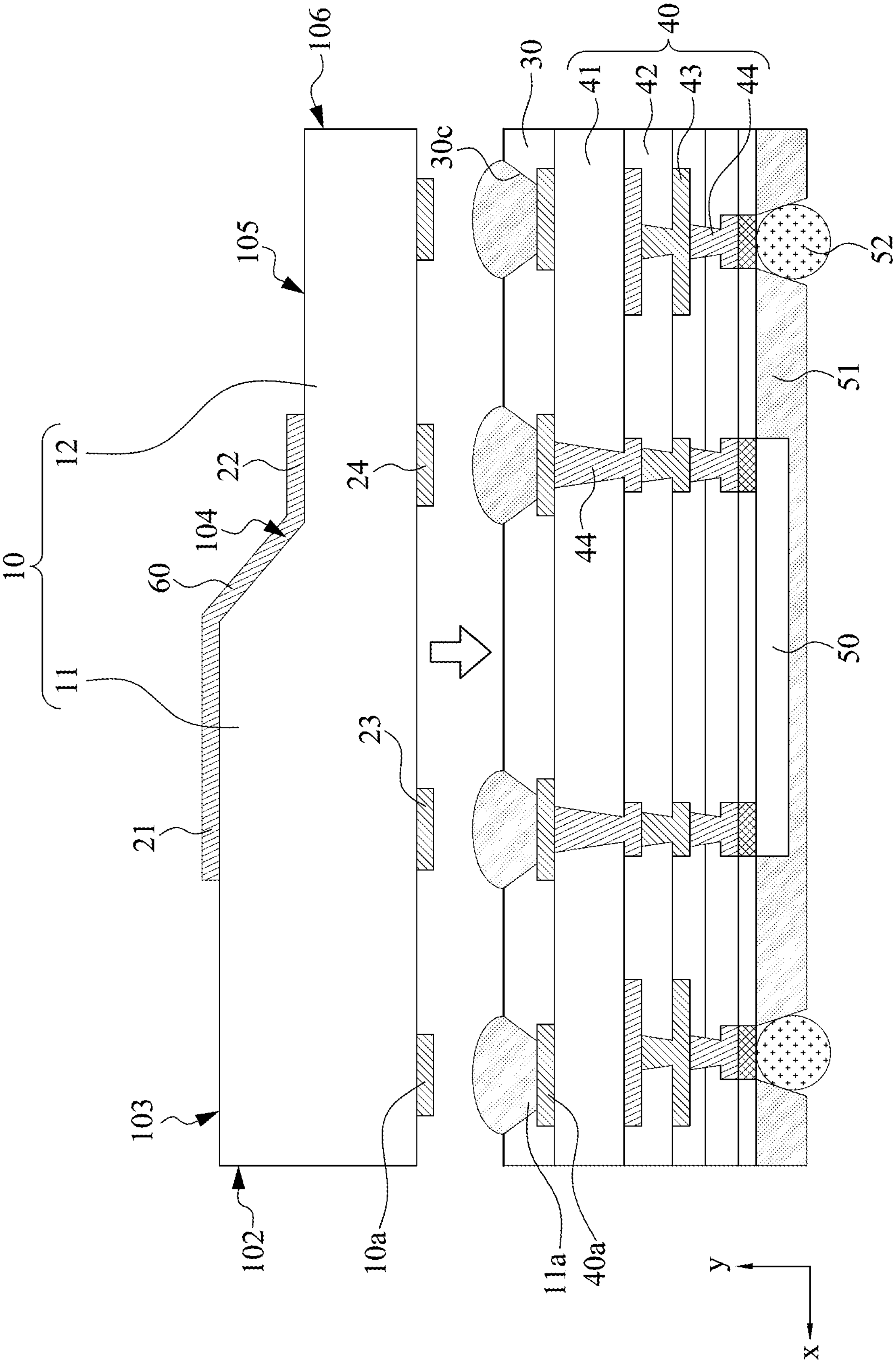
FIG. 14C illustrates one or more stages of a method of manufacturing an antenna device in accordance with some embodiments of the present disclosure.

FIGS. 14A, 14B, and 14C illustrate stages of a method of manufacturing an antenna device in accordance with some embodiments of the present disclosure. In some embodiments, the antenna device 6 in FIG. 6 may be manufactured by the operations described below with respect to FIGS. 14A, 14B, and 14C.

Referring to FIG. 14A, the dielectric element 10 may be provided. The surface 104 of the dielectric element 10 of the antenna device 6 is non-perpendicular with respect to the surface 103 and the surface 105. Then, similar to FIG. 11B, the antennas 21, 22, 23, and 24 may be formed on the dielectric element 10 by sputtering, electroplating, or electroless plating.

Referring to FIG. 14B, the conductive layer 60 may be formed on the surface 104. In some embodiments, the conductive layer 60 may be formed on the dielectric element 10 by sputtering, electroplating, or electroless plating. In some embodiments, the conductive layer 60 may be formed on the dielectric element 10 after forming the antennas 21 and 22. In some other embodiments, the conductive layer 60 may be formed on the dielectric element 10 in the same operation with the antennas 21 and 22. In some embodiments, the non-perpendicular surface 104 may facilitate the sputtering, electroplating, or electroless plating for the conductive layer 60. In some embodiments, the conductive layer 60 may electrically connect the antenna 21 with the antenna 22.

The operation in FIG. 14C may be similar to the operations in FIG. 11C and is not repeated hereafter for conciseness.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An antenna device, comprising:

a dielectric element including a first region and a second region, wherein the dielectric element is configured to provide a first antenna gain with a first antenna on the first region, and configured to provide a second antenna gain with a second antenna on the second region, the first antenna gain is greater than the second antenna gain, and wherein the dielectric element comprises a first upper surface on the first region, a second upper surface on the second region, a first lateral surface extending between the first upper surface and the second upper surface, a level of the first upper surface is higher than a level of the second upper surface, and the first upper surface is free from vertically overlapping the second upper surface; and a reinforced structure disposed within the first region, wherein the reinforced structure horizontally overlaps the first lateral surface and is free from vertically overlapping the first antenna.

2. The antenna device of claim 1, wherein a distance between the first antenna and the first lateral surface is greater than a distance between the second antenna and the first lateral surface.

3. The antenna device of claim 1, wherein the reinforced structure is closer to the first lateral surface than the first antenna is.

4. The antenna device of claim 1, wherein a distance between the first antenna and the first lateral surface is greater than a distance between the reinforced structure and the first lateral surface.

5. The antenna device of claim 1, wherein the reinforced structure has a first layer and a second layer under the first layer, the first layer is free from laterally overlapping the first antenna, and the second layer laterally overlaps the second antenna.

6. The antenna device of claim 5, wherein a level of the second layer of the reinforced structure is higher than the level of the second upper surface.

7. The antenna device of claim 1, wherein the dielectric element further has a bottom surface opposite to the first upper surface and the second upper surface, a second lateral surface extending between the first upper surface and the bottom surface, and a third lateral surface extending the bottom surface and the second upper surface.

8. The antenna device of claim 7, wherein the second upper surface, the first lateral surface, and the third lateral surface collectively define a step structure, and the first lateral surface is free from laterally overlapping the third lateral surface.

9. The antenna device of claim 7, wherein a width of the first upper surface is greater than a width of the second upper surface in a cross-sectional view.

10. The antenna device of claim 7, wherein the second antenna is free from laterally overlapping the third lateral surface.

11. The antenna device of claim 7, wherein the dielectric element comprises:

a first dielectric layer abutting the first antenna and defining the first upper surface; and a second dielectric layer separated from and disposed under the first dielectric layer by an interface therebetween, wherein the second dielectric layer defines the second upper surface.

12. The antenna device of claim 11, wherein a height of the first lateral surface is substantially equal to a thickness of the first dielectric layer.

13. The antenna device of claim 11, wherein the dielectric element further comprises a third dielectric layer defining the bottom surface, and a conductive via penetrates the third dielectric layer.

14. The antenna device of claim 11, wherein a width of the first dielectric layer is different from a width of the second dielectric layer in a cross-sectional view.

15. The antenna device of claim 14, wherein the first dielectric layer defines the second lateral surface, and the second dielectric layer has a fourth lateral surface substantially aligned with the second lateral surface.

16. The antenna device of claim 14, wherein the width of the first dielectric layer is less than the width of the second dielectric layer in the cross-sectional view.

17. The antenna device of claim 11, wherein a thickness of the first dielectric layer is different from a thickness of the second dielectric layer.

18. The antenna device of claim 7, further comprising:

a grounding structure disposed on the bottom surface of the dielectric element, wherein the grounding structure is free from vertically overlapping the reinforced structure.

19. The antenna device of claim 18, further comprising:

a third antenna coupled to the first antenna and configured to function as a feeding portion, wherein the third antenna laterally overlaps the grounding structure.

20. The antenna device of claim 7, wherein the third lateral surface is free from laterally overlapping the reinforced structure.

* * * * *